United States Patent [19]

Agarawal et al.

[11] Patent Number: 5,265,251

[45] Date of Patent: Nov. 23, 1993

[54] MECHANISM FOR ALLOWING A SINGLE OPERATION TO SHIFT THE FOCUS BETWEEN USER APPLICATIONS HAVING DIRECT HARDWARE LEVEL ACCESS TO MULTIPLE DISPLAYS IN A VIRTUAL TERMINAL ENVIRONMENT

[75] Inventors: Harish C. Agarawal; Richard L. Verburg, both of Austin, Tex.

[73] Assignee: International Business Machines Corporation, Armonk, N.Y.

[21] Appl. No.: 37,465

[22] Filed: Mar. 25, 1993

Related U.S. Application Data

[63] Continuation of Ser. No. 473,288, Feb. 1, 1990, abandoned.

[51] Int. Cl.$^5$ .............................................. G06F 9/46
[52] U.S. Cl. ................................... 395/650; 395/155; 364/237.2; 364/259.5; 364/281.7; 364/286.3; 364/232.1; 364/DIG. 1
[58] Field of Search ................. 395/155, 157, 650, 800

[56] References Cited

U.S. PATENT DOCUMENTS

| | | | |
|---|---|---|---|
| 4,761,642 | 8/1988 | Huntzinger | 340/721 |
| 4,782,462 | 11/1988 | Kaplinsky et al. | 395/650 |
| 4,890,257 | 12/1989 | Anthias et al. | 395/275 |
| 4,896,290 | 1/1990 | Rhodes et al. | 395/650 |
| 4,975,690 | 12/1990 | Torres | 340/721 |
| 5,029,077 | 7/1991 | Fatahalian et al. | 395/275 |
| 5,060,149 | 10/1991 | Flurry et al. | 395/650 |
| 5,109,510 | 4/1992 | Baker et al. | 395/650 |

OTHER PUBLICATIONS

*User Centered System Design*, 1986, Chapter 12, "The Structure of Users' Activities", Allen Cypher, pp. 243-263.
IBM Technical Disclosure Bulletin "Method for Achieving Task Independence in a Multiple Virtual Terminal Environment," D. C. Baker, P. L. Cericola, A. K. Wilson, vol. 29, No. 4, Sep. 1986, p. 1711.
IBM Technical Disclosure Bulletin, "Keyboard Support for Simulated Processor Power Down," R. Krishnamurty, T. L. Mothersole, vol. 29, No. 6, Nov. 1986, p. 2692.
IBM Technical Disclosure Bulletin, "Screen Manager Ring with Reordering", F. H. Fatahalian, G. A. Flurry, vol. 29, No. 11, Apr. 1987, pp. 5126-5129.
IBM Technical Disclosure Bulletin, "Method to Provide Concurrent Update of Multiple Physical Displays by Multiple Virtual Terminals" vol. 30, No. 1, Jun. 1987, pp. 125-126.

*Primary Examiner*—Parshotam S. Lall
*Assistant Examiner*—Ayni Mohamed
*Attorney, Agent, or Firm*—Mark E. McBurney

[57] ABSTRACT

A method is provided for shifting focus between multiple program applications in a virtual terminal environment such that next successive application will always become visible and capable of interaction with a user upon a single hot key operation. In the system of the present invention multiple applications are provided, at lease one of which is capable of writing directly onto multiple hardware display devices. Also, a plurality of virtual terminals are opened, each being associated with a particular program application and corresponding to a hardware display device. All but one of the virtual terminals associated with a single application are designated as "non participating" in any hot keying operation. Therefore, upon implementation of a hot key operation these non participating virtual terminals are ignored and the next participating virtual terminal will be activated. In this manner, since there is only one participating virtual terminal per application, each hot key operation guarantees that the next successive program application will become capable of user interaction and visible on the hardware display devices.

12 Claims, 16 Drawing Sheets

| STATE | APPLICATION$_1$ - 50a | APPLICATION$_2$ - 50b | APPLICATION$_3$ - 50c |
|---|---|---|---|
| INITIAL CONDITIONS | ACTIVE ON DISPLAY 42A | REQUESTING DISPLAY 42A | ACTIVE ON DISPLAYS 42B, 42C |
| FIRST HOT KEY OPERATION | SIG RETRACT 42A ACK REQUESTING DISPLAY 42A | SIG GRANT DISPLAY 42A; REQUESTS DISPLAY 42B<br><br>ACTIVE ON DISPLAYS 42A, 42B | SIG RETRACT 42B ACK REQUESTS 42B ACTIVE ON 42C |
| SECOND HOT KEY OPERATION | | SIG RETRACT 42B ACK<br><br>SIG RETRACT 42A ACK REQUESTS DISPLAY 42A | SIG GRANT 42B REQUEST 42A<br><br>SIG GRANT 42A ACTIVE ON DISPLAYS 42A, 42B, 42C |
| THIRD HOT KEY OPERATION | SIG GRANT 42A ACTIVE ON 42A | | SIG RETRACT 42A ACK<br><br>ACTIVE ON 42B, 42C |

FIG. 11

MECHANISM FOR ALLOWING A SINGLE OPERATION TO SHIFT THE FOCUS BETWEEN USER APPLICATIONS HAVING DIRECT HARDWARE LEVEL ACCESS TO MULTIPLE DISPLAYS IN A VIRTUAL TERMINAL ENVIRONMENT

This is a continuation of application Ser. No. 07/473,288 filed Feb. 1, 1990 now abandoned.

CROSS REFERENCE TO RELATED APPLICATIONS

Co-pending application Ser. No. 7/225,630 which is a continuation of Ser. No. 820,451 and having the same assignee, filed Jan. 17, 1986, "A Virtual Terminal Subsystem," to Baker et al, Co-pending application Ser. No. 7/241,757 which is a continuation of Ser. No. 820,453 and having the same assignee, "Virtual Terminal Monitored Mode," to Fatahalian et al.

BACKGROUND OF THE INVENTION

This invention relates generally to virtual terminal environment wherein a plurality of program applications can be run simultaneously, each of these applications having at least one virtual terminal associated therewith. Additionally, a plurality of hardware display devices are provided and at least one of the program application is capable of writing directly onto at least two of the hardware display devices.

Generally, in a virtual terminal environment, a user of a system is required to perform several "hot key" operations before shifting the user's focus, or subject from a first application to the next successive application. This inefficient multiple hot keying was due to the fact that a single hot key operation merely shifted the focus between virtual terminals, not applications. Since multiple virtual terminals may be associated with a single program application, it may take a user several hot key sequences before the focus is actually shifted to the next application. This excessive hot keying creates a great deal of inefficiency with regard to time and resources, as well as, the frustration encountered by the user of a prior art system of this type.

SUMMARY OF THE INVENTION

In contrast to the prior art, the present invention allows a user of a computer system to shift the focus, or hot key, from one program application to the next successive application with only a single hot key operation.

Broadly, the present invention operates within a virtual terminal environment wherein at least two program applications are provided. Also included are a plurality of hardware display devices and virtual terminals.

In the event a single program application is capable of opening greater than one virtual terminal (i.e. a multi-process application), the application designates all but one of these virtual terminals as "non participating" in any hot key operations. Therefore, when a user desires to shift the focus from one program application to the next, a single hot key operation will accomplish this task. For example, assume a user is interacting with a first multi-process program application, through a first activated virtual terminal. Also assume that this first application has opened a plurality of virtual terminals. After a hot key operation, the prior art virtual terminal subsystem deactivates the first virtual terminal and proceeds to make the next virtual terminal active. However, the next virtual terminal may be one which has been opened by the first application. Thus, the user will merely be hot keying between virtual terminals of the first application, not between the first and next successive program application. In contrast, the present invention would designate all but one of the plurality of virtual terminals associated with each program application as non participating in hot keying. Therefore, the system would ignore all non participating virtual terminals and activate the next virtual terminal which has not been designated as non participating. Since there is only one virtual terminal not designated as non participating in hot keying per application, each hot key operation will shift focus from a first program application to the next application, not merely between virtual terminals which may be associated with the same program application.

Therefore, in accordance with the previous summary, objects, features and advantages of the present invention will become apparent to one skilled in the art from the subsequent description and the appended claims taken in conjunction with the accompanying drawings.

BRIEF DESCRIPTION OF THE DRAWINGS

FIGS 11A and 11B are charts showing the state information of each program application depicted in FIG. 10 for a specific example of the operation of the present invention;

DETAILED DESCRIPTION OF THE PREFERRED EMBODIMENTS

Figure 1:
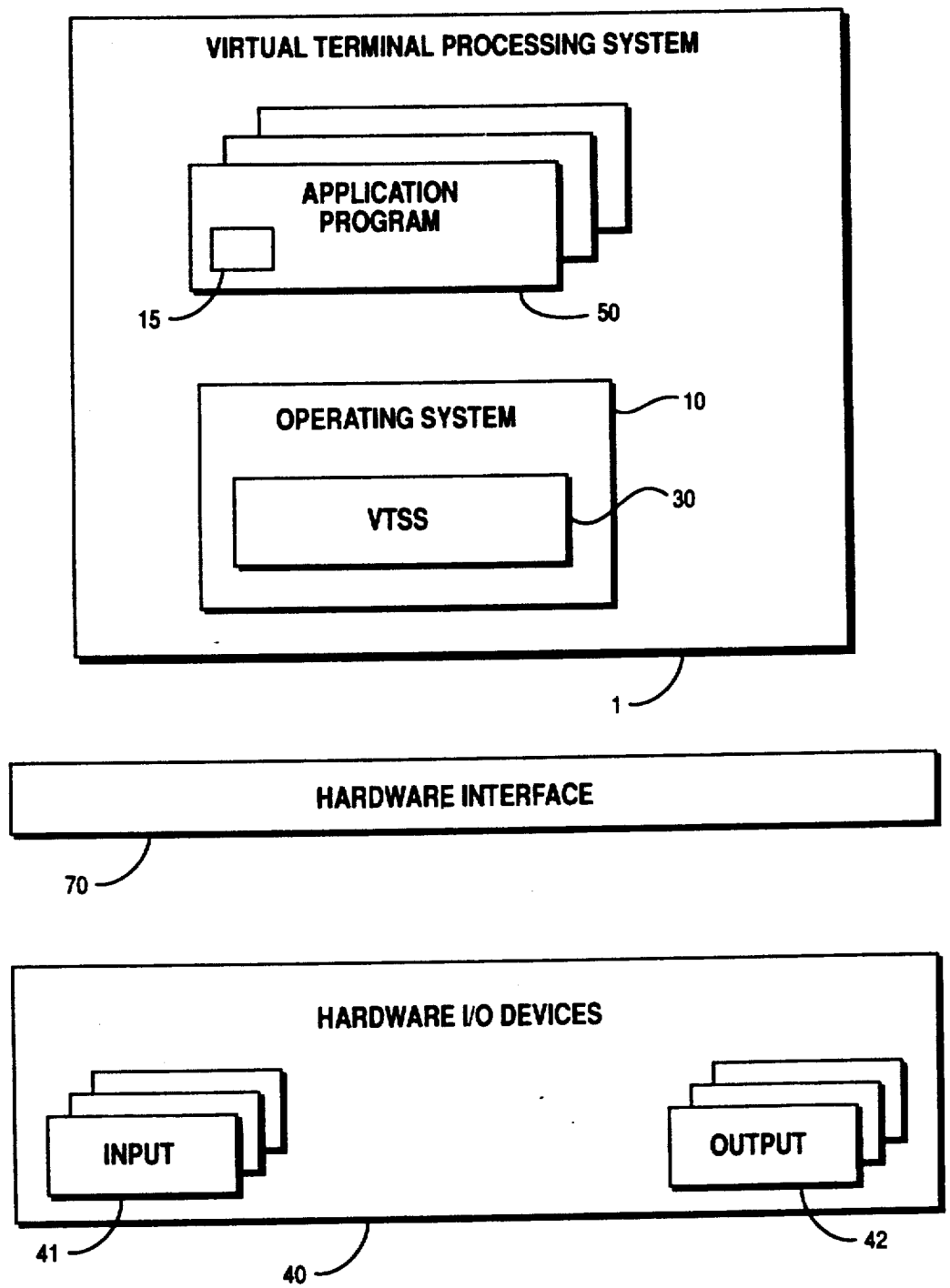
FIG. 1 is a block diagram depicting the layers contained within the processing system of the present invention.

FIG. 1 shows the layers of a virtual terminal processing system. The application 50 which runs on an operating system 10, such as a UNIX (UNIX is a registered trademark of AT&T Co.) operating system, or the like. The next layer is the virtual terminal subsystem 30 which manages all of the display hardware input/output devices 40. These hardware devices 40 include, but are not limited to, input devices 41 (such as, a keyboard, mouse, tablet) and output devices 42 (such as, a sound device and display).

In a virtual terminal processing system, a user driven user interface switches between activities upon a command from the user. This processing system virtualizes the use of the resources, such that the entire resource is given to an application 50 for a user's activity. This is carried out in the virtual terminal subsystem 30. The virtual terminal subsystem 30 provides terminal support in the virtual terminal environment.

An application 50 is capable of opening as many virtual terminals as the number of physical hardware displays 42 it wants to use. Virtual terminals give the applications 50 the impression that there are more display devices 42 than are physically present, that there are more input devices 41 than are physically present, and that these devices may have different characteristics than the physical devices. Also, with virtual terminals a program can be written such that it is independent of the specifics of the physical terminal devices, e.g., display buffer organizations, presence of optional input devices, etc. Additionally, virtual terminals relieve the programmer of developing individualized mechanism for dealing with the limitations of the actual resources.

A typical virtual terminal model may utilize the emulation of a glass teletype, such as a keyboard send-/receive (KSR) teletype, although the use of other models are contemplated by the scope of the present invention. For example, one mode, or terminal model which may be used, supports the terminal requirements of the UNIX operating system in a virtual machine environment. The UNIX operating system requires a glass teletype emulation such as the Digital Equipment Corporation VT100, or IBM 3101 which is an enhancement of the original KSR teletype.

The KSR terminal mode is an ASCII terminal emulation in the spirit of the ANSI 3.64 standard utilizing a PC ASCII code set rather than the ANSI 3.4/3.41 code sets. The ANSI 3.64 data stream is extended, as specified by the standard, to support enhanced sound generation capability, to handle the flow of locator events, and to provide various controls to switch physical displays, fonts and terminal characteristics.

Each virtual terminal embodies the characteristics of single KSR terminal. That is, the virtual terminal recognizes and processes the data stream received which causes the requesting actions to occur. These include moving the cursor, or drawing characters onto the virtual display, inserting or deleting lines, clearing the screen, or changing the attributes with which characters are rendered. In addition to these actions, the outbound data stream may cause the generation of sequences of continuous tone sounds, or cause the virtual display to be rendered on any of the available physical displays 42.

A virtual terminal receives input information from a virtual keyboard and/or a virtual locator, and outputs data to a virtual display. Thus, the virtual terminal can always expect to receive input from its virtual input devices and can always output to its virtual display. These virtual devices may or may not have physical devices allocated to them. Therefore, the virtual terminal may not actually receive input or write to a physical display 42. As each virtual terminal recognizes and processes the data stream inbound from the keyboard it may, if requested, automatically return various characters and simple functions back to its virtual display. This operation permits the application 50 to run as if it were using physical terminal hardware devices 40. Thus, the majority of existing applications 50 require no modification to run in the virtual terminal environment since the applications 50 are not aware that the virtual terminal is not a physical terminal 42.

Figure 1A:
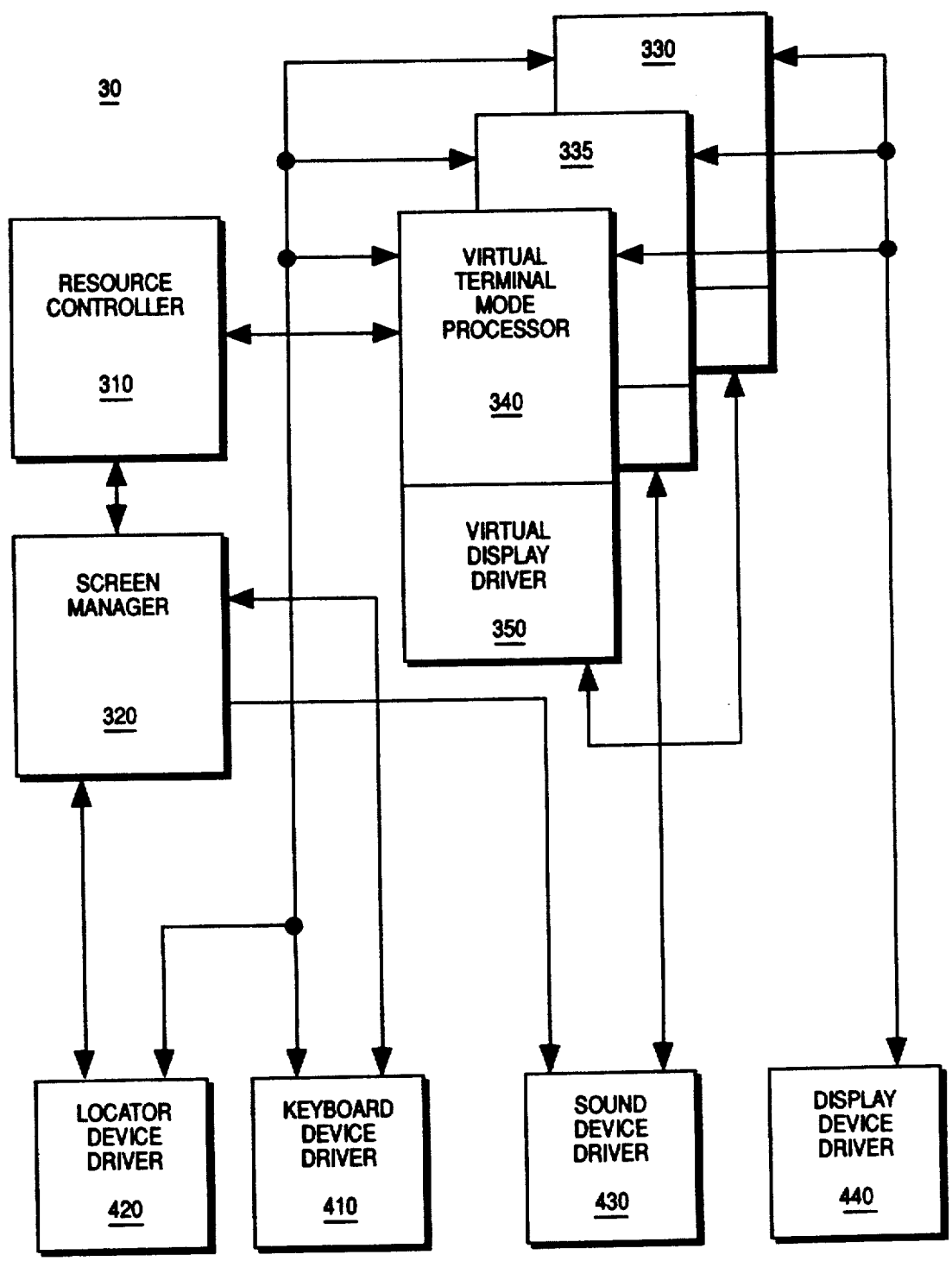
FIG. 1A is another block diagram showing the components of the virtual terminal subsystem of the present invention.

FIG. 1A illustrates the components of the virtual terminal subsystem 30 which includes a resource controller 310, a screen manager 320, a keyboard device driver 410, a locator device driver 420, a sound device driver 430, a display device driver 440, and multiple virtual terminals 330.

The resource controller 310 initializes and terminates the virtual terminal subsystem 30. It also allows the operating system 10 and application program 50 to query and modify the configuration and characteristics of the interactive devices, i.e. the physical terminal which is available to the user. Further, resource controller 310 allocates and deallocates the system resources required for the operation of a virtual terminal as it is opened and closed, i.e. created or destroyed.

The screen manager 320 performs the allocation of physical devices 40 to the virtual devices used by the virtual terminals. The screen manager 320, in conjunction with the keyboard and locator device drivers, 410, 420 implements the time and space sharing required to virtualize these input devices. In a similar manner, the screen manager 320, implements the time sharing required to virtualize a display. At a given time the physical display 42 is allocated to one and only one of the virtual displays used by the virtual terminals.

The screen manager 320 also allocates all the physical devices 40 to the virtual devices of the active virtual terminal. The active virtual terminal is the terminal which provides for user interaction. The active virtual terminal can actually receive input from a device 41 and produce output on a physical display 42. Further, the screen manager 320 provides for reallocation of the physical resources 40. The motivation for reallocation of the physical devices 40 results from either user requests or requests from an application 50, User requests are through the physical input devices 41, such as a logical keyboard, or a similar logical mouse which are allocated to the screen manager 320. Reallocation of the physical resources 40 involves removing the resource from the currently active virtual terminal and allocating the resources to the newly activated virtual terminal. This re allocation of resources requires the cooperation of both the deactivated and activated terminals. As previously noted, the participation of the device drivers is required to allocate physical devices 40, thus ensuring synchronization of events, such as key strokes and work request acknowledgements.

Another component of the virtual terminal subsystem 30 is the keyboard device driver 410, which routes input events from the physical keyboard 41 to virtual terminals, based on instructions received from screen manager 320. Optional components of the virtual terminal subsystem 30 are the locator device driver 420 and the sound device driver 430. The locator device driver 420 routes input events from the physical locator 41 to virtual terminals based on instruction received from the screen manager 320. The sound device driver 430 is capable of providing audio output from the subsystem 30 to physical devices 42. Also included in the virtual terminal manager are a plurality of display device drivers 440 which service interrupts received from the display adaptors.

The virtual terminal subsystem is capable of providing arbitrarily large number of virtual terminals. The actual maximum number of virtual terminals may vary from implementation to implementation and will be dictated by system resource utiliztion considerations. Each virtual terminal includes a virtual terminal mode processor 340. The virtual terminal mode processor 340 provides the KSR-like operation of the virtual terminal. Each virtual terminal also includes a virtual display device driver 350. The virtual display driver 350 receives all virtual terminal mode processor 340 outputs, writes them to the virtual display, and then virtualizes the display. Each virtual terminal also includes a common device utility by which the virtual terminal mode processor 340 communicates its resource requests to the resource controller 320.

Initialization of the virtual terminal subsystem 30 is performed by the resource controller 310. First, the resource controller 310 must receive a list containing the physical devices 40 (displays, keyboard, etc.) included in the system. The resource controller 310 must also receive identifiers for the various other subsystem components, such as fonts, and the virtual terminal defaults. Initialization requires: 1) checking the above initialization information for completeness and correctness, 2) initializing the physical input devices 41, 3) processing the supplied fonts, 4) creating the screen manager 320, 5) creating the paths necessary for communication with the screen manager 320, 6) creating the paths necessary for letting the screen manager 320 communicate with the input/output devices 40, and 7) initializing the global data structure shared between components.

The resource controller 310 initializes subsystem in the following manner. The following routine is in program design language from which source and machine code are derivable.

```
INITIALIZE GLOBAL DATA STRUCTURE
IF THE INITIALIZATION INFORMATION NOT
    COMPLETE AND CORRECT
THEN
    PRESENT ERROR INDICATION
ELSE
    CALL INIT_DEVICES
CALL CREATE_SM
PRESENT SUCCESS INDICATION
PREPARE TO SERVICE RESOURCE COMMANDS FROM
    THE OPERATING SYSTEM
```

The routine INIT_DEVICES initializes the various device drivers in the system and places the requisite information in the global data structure for use by various components. It also derives the information necessary for the system to use the fonts identified in the initialization parameter. The routine also creates communication paths from the devices 40 to the resource controller 310 (RC), keyboard and locator device drivers, 410 and 420 and the operating system 10.

VIRTUAL TERMINAL OPEN

After initialization, the resource controller 310 is ready to accept resource requests. When a request is received from operating system 10 to open (create) a virtual terminal, the resource controller 310 takes the following steps: 1) initializes the global data associated with the virtual terminal, 2) performs the necessary functions on the virtual terminal mode processor 340 to ensure the virtual terminal process functions correctly, 3) establishes communication paths to/from the virtual terminal mode processor 340 and from/to the device drivers utilized, 4) assigns an external identifier to the virtual terminal, and 5) initializes the virtual terminal.

Subsequent to initialization, the resource controller 310, opens a virtual terminal, as indicated above, by implementing the following routine.

```
IF MAXIMUM NUMBER OF VIRTUAL TERMINALS
OPEN
THEN
    INDICATE NO SUCCESS
ELSE
    CREATE_VT
    CREATE_PATHS
    INITIALIZE THE VIRTUAL TERMINAL
    TELL_SM (OPEN)
    INDICATE_SUCCESS
```

The routine CREATE_VT copies virtual terminal mode processor 340 (VTMP), which permits each virtual terminal to have its own data and stack space.

The routine CREATE_PATHS establishes communication paths to/from the virtual terminal and from/to the device drivers present and the corresponding operating system 10 which requested the virtual terminal be opened. This routine also establishes a communication path from the screen manager 320 to the virtual terminal. Both CREATE_VT and CREATE_PATHS save information in the global structure.

The routine TELL_SM informs the screen manager 320 that a new virtual terminal has been opened. This routine sends the name (identifier) of the new virtual terminal (and index into the global data structure) such that the screen manager 320 can derive needed information. The screen manager 320 then proceeds to make the virtual terminal active (see below). The routine TELL_SM waits for the screen manager 320 to complete its operations before allowing the resource controller 310 (RC) to continue.

The virtual terminal mode processor 340 must finish the initialization of the virtual terminal by performing the following routine:

```
QUERY_DEVICES

SELECT_DISPLAY

SELECT_INPUT
```

The routine QUERY_DEVICES returns the identifiers assigned for the available devices to these devices. The routine SELECT_DISPLAY allows the virtual terminal mode processor 340 to choose which of the available displays to use. The SELECT_DISPLAY function sets up the paths to let the virtual terminal mode processor 340 communicate with the virtual display driver 350 for the chosen display. This allows the virtual terminal to use its virtual display independently of other virtual terminals. The virtual terminal may then begin to interact with the user when it become active.

The routine SELECT_INPUT allows the virtual terminal mode processor 340 to choose to receive or not receive input events from the keyboard and/or locator, via the respective device drivers 410, 420.

At this point, the operating system 10 is able to communicate with the virtual terminal. The operating system 10 also is able to issue screen management commands concerning the virtual terminal to the screen manager 320, if a communication path is provided therebetween.

VIRTUAL TERMINAL CLOSE

To close a virtual terminal that has been opened by the above stated steps, either the operating system 10, or the virtual terminal may issue a close request. The resource controller 310 receives the command and performs the following actions:

TELL_SM (CLOSE)

RECOVER_RESOURCES

INDICATE_COMPLETION

The routine TELL_SM sends a command to the screen manager 320 identifying (via the internal identifier) the virtual terminal to be closed. This routine waits for the screen manager 320 to complete its duties (see below) before proceeding. The routine RECOVER_RESOURCES recovers all resources (storage, control blocks, etc.) used by the virtual terminal being closed and removes the virtual terminal from the global data structure. The routine INDICATE_COMPLETION notifies the requester of completion of the close operation.

As noted above, the screen manager 320 performs the following actions while the resource controller 310 waits.

COMMAND_MP (CLOSE)

NEW_VT_ACTIVE

ACK_RC

The routine COMMAND_MP sends a close command to the virtual terminal via the communication path therebetween, and waits for the virtual terminal mode processor 340 to respond. The routine NEW_VT_ACTIVE makes another virtual terminal active, that is, allocates the physical input and output devices 40 to the newly activated virtual terminal (see below). The routine ACK_RC communicates with resource controller 310 which allows RC 310 to continue its close processing functions.

The virtual terminal mode processor 340 receives the close command (previously sent by the routine COMMAND_MP) and performs the following actions.

RELEASE_DISPLAY

ACK_SM

The RELEASE_DISPLAY routine indicates to the virtual display driver 350 (VDD) that its resources can be released. The ACK_SM routine allows the screen manager 320 to continue its close processing.

VIRTUAL TERMINAL
ACTIVATION/DEACTIVATION

The act of making a virtual terminal active may happen because of an open or close, or because the user has requested that another virtual terminal be made active. It requires the cooperation of screen manager 320, the virtual terminal mode processor 340 for the currently active virtual terminal, the virtual terminal mode processor 340 for the virtual terminal to be activated, and the input device drivers. The screen manager 320 performs the following actions.

FIND_VT

COMMAND_KDD (NEW_VT)

COMMAND_LDD (NEW_VT)

COMMAND_VT (DEACTIVATE)

COMMAND_VT (ACTIVATE)

UPDATE_DATA (NEW_VT)

The routine FIND_VT determines which virtual terminal should be made active. The result depends on the rules associated with screen management and the actual command received.

The routine COMMAND_KDD sends a command to the keyboard device driver 410 identifying the virtual terminal to receive input from the physical keyboard 41. The routine COMMAND_LDD sends a command to the locator device driver 420 identifying the virtual terminal to receive input from the physical locator 42. These routines wait for the device drivers 410,420 to complete their actions before continuing their routines. These device drivers then perform identical actions, as discussed below.

The routine COMMAND_VT with the deactivate option causes the currently active virtual terminal to perform whatever actions are necessary to implement deactivation of the virtual terminal (see below). The routine COMMAND_VT with the activate option causes the newly active virtual terminal to perform whatever actions are necessary to implement activation of the virtual terminal (see below).

The routine UPDATE_DATA manipulates the screen manager's 320 internal data structures such that the screen manager 320 knows which virtual terminal is active.

The keyboard device driver 410 and/or the locator device driver 420 perform the following.

SET_NEW_PATH_MODES

SEND_STATUS

ACK_SM

The routine SET_NEW_PATH_MODES places the identifier, for the communication path to the newly active virtual terminal, into an internal structure. This routine also sets up the correct operating node of the device for the virtual terminal. The routine SEND_STATUS informs the virtual terminal about the current status of the physical devices 40, i.e. what relevant keys (or buttons) are already pressed when the virtual terminal becomes active. The routine ACK_SM allows the screen manager 320 to continue its processing in a synchronized manner.

The virtual terminal mode processor 340, of the virtual terminal being deactivated performs the following.

DEACTIVATE_VDD

NO_SOUND

The routine DEACTIVATE_VDD tells the virtual display driver 350 for the virtual terminal being deactivated that it cannot write to the physical display 42, but instead must buffer all output from the virtual terminal. The routine NO_SOUND sets internal flags for the virtual terminal mode processor 340 such that requests by program application 50 for sound are not output to the sound device driver 430 (SDD).

The virtual terminal mode processor 340 of the virtual terminal becoming active performs the following.

ACTIVATE_VDD

SOUND_OK

The routine ACTIVATE_VDD tells the virtual display driver 350 for the virtual terminal being activated that it is able to write to the physical display 42. However, the virtual display driver 350 first sends data from the buffer which has been maintained during its inactive period to the display 42. Thus, the user sees the most current information available from the application 50. The routine SOUND_OK sets internal flags for the virtual terminal mode processor 340 such that program application 50 requests for sound are sent to the sound device driver 430. At this point, the user is able to interact with the newly activated virtual terminal.

The virtual terminal takes input from the operating system 10 in the form of output that would have been directed to the physical display terminal 42 and virtualizes this output such that an application 50 believes an actual physical terminal exists. If the virtual terminal is currently active, (i.e. the terminal the user is currently interacting with), then the virtual terminal is provided with all the physical resources 40 required for operation. The virtual terminal obtains input from the locator device driver 420 and the keyboard device driver 410. Therefore, the inputs from devices drivers 410, 420 will be routed to the currently active virtual terminal. Any sound that is generated will go to the sound device driver 430, and any display that is generated will be passed to a a display driver 440, for presentation to the user on the actual screen of the physical display device 42.

Other virtual terminals that may be opened, but not currently active are capable of receiving output from program application 50. When these inactive virtual terminals are receiving this output, it is unknown to them whether they are active or inactive. Therefore, when an inactive virtual terminal receives an output request to display data, instead of sending the request to a device driver 440, it will be virtualizing the output into a virtual device driver buffer.

This device driver buffer is a piece of storage (RAM) which holds the current state of the virtual display6. At a given point in time, the virtual device driver buffer of a virtual terminal contains the accumulated front of screen representation of all output requests sent to that virtual terminal. If the virtual terminal gets activated by the user, then the content of the virtual device driver buffer will be displayed on the actual display screen.

At the time that a particular virtual terminal is given real physical display resources 42, the virtual terminal must convert the accumulated data in the virtual device driver buffer to physical display device commands. This results in the user being able to see the current snapshot of information. In other words, when a virtual terminal is forced to relinquish its physical display resources 42, it is conceptually similar to a user turning their head away from a physical terminal for a period of time. When the user turns their head back to look at the physical terminal, the total accumulated display information to that point time is viewed.

It is important that the device driver buffer be updated even when no real devices are allocated to it. These virtualized device driver buffers are maintained in device dependent form in the display device driver 440 component of the virtual terminal subsystem 30.

The screen manager 320 interacts with a user in the following fashion. A ring of terminals exist such that each time a virtual terminal is opened, it is placed into this ring. At the time a user seeks to interact with a particular virtual terminal, the user can implement a certain key sequence on the keyboard (input device 41). This key sequence is transmitted to the screen manager 320 by the keyboard device driver 410. The screen manager 320 then determines by checking the ring structure, which one of the virtual terminals is currently available to the user and is to be made active. In this manner a user can select which activity of which application 50 to interact with at any given time.

The operations involved in changing the activity state of a virtual terminal involve the screen manager 320, the device drivers 410, 420, 430, 440 and the virtual terminals. Upon notification of the screen manager 320 that a new terminal is to be activated, the screen manager 320 sends the new routing information to an input device driver 410, 420. The keyboard or locator device drivers 410, 420 receive this information and determine that the routing of input events must be changed such that the newly active virtual terminal receives these inputs.

The output devices are handled in a slighty different manner. The currently active virtual terminal is notified by the screen manager 320 that it will be deactivated. The virtual terminal itself, in the case of the sound device driver 430, is responsible for determining that no sound requests may be sent to sound device driver 420, which produces sound audible to the user.

For the virtual display driver 350 a different mechanism is invoked to deactivate a virtual terminal. In this case, the virtual display driver 350 presents itself to the active virtual terminal as a series of routines which can be called by the active virtual terminal to produce output on the physical display 42. At the time a virtual terminal is made inactive a routine from the virtual display driver 350 is called that indicates the virtual terminal is inactive. Therefore, when an application 50 attempts to output to a physical display 42 through its virtual terminal, the virtual display driver 350 places any information that would be sent to physical device 42 in the virtual device driver buffer. This allows the application 50 which is using the virtual terminal to communicate with the virtual terminal as if it were still active. The virtual terminal that is becoming active calls a routine from the virtual display driver 350 which indicates that the virtual terminal is active. The virtual terminal is now able to use its virtual display driver 350 in the same manner as when it was inactive, but its virtual display driver 350 is now capable of actually writing to the display adapter hardware 42.

As a result, an application 50 using a virtual terminal, does not need to know whether the virtual terminal is active or inactive. It can communicate with the associated virtual terminal at anytime and any updates made to its virtual display become visible to the user when the virtual terminal becomes active. The application 50 operates independently of the active, or inactive state of its associated virtual terminal.

Direct access of display hardware 42 by a program application 50 is another aspect of the present invention which is critical to its understanding.

Again, referring to FIG. 1, the various layers in a data processing system environment are shown and include all of the previously discussed components. In the data processing system of FIG. 1, the virtual terminal subsystem 30 is capable of operating in two distinct modes. One mode is the KSR mode, while the second is the monitor mode. As previously discussed, the KSR mode is used primarily for displaying text on the display 42 and cannot be used for high performance graphics applications. Additionally, KSR is a very slow interface, since the commands going to a KSR virtual terminal originate for the application program 50 and proceed through every layer of the data processing system, shown in FIG. 1, before any data is output to the display 42.

The monitored mode supports applications 50 which are capable of interacting directly with the hardware refresh buffers contained in the display devices 42, regardless of whether they are in a character or all points addressable (APA) arrangement. Thus the virtual terminal subsystem 30 is bypassed and data is output directly to the display device 42.

In monitored mode the input devices 41 have their inputs routed through the virtual terminal subsystem 30 to the application 50. The applications using the monitor mode have an option of defining a circular buffer 15 (FIG. 1) in the memory space of application program 50. The virtual terminal subsystem 30 receives an interrupt from the input devices 41 and deposits the data directly into the input buffer 15. The virtual terminal subsystem 30 does not generate and issue an interrupt signal to the application 50, unless it is the first time the data is deposited into the circular buffer 15.

If application 50 does not choose to define a circular buffer 15, the virtual terminal subsystem 30 receives an interrupt from the input devices 41 and uses an interrupt path to transmit the data. This interrupt path requires queuing interface management, which involves communications between the various layers of the communication system such as the operating system 10 and the virtual terminal subsystem 30. Therefore, application 50 is subject to the extra layers of queuing because of the presence of operating system 10, and the virtual terminal subsystem 30.

Thus, if the application 50 defines the circular buffer 15, the aforementioned queuing overhead is eliminated. In this way, the application program 50 can track the input from a keyboard, mouse, or a tablet much faster. In this data processing system, the key element with respect to handling inputs from input devices 41 lies in the ability of the application 50 to define the circular input buffer 15 which is managed by the application 50 and the virtual terminal subsystem 30.

The structure of the circular buffer 15 requires a status area which is located in the first 32 bytes of the buffer. The status area contains an offset pointer for the virtual terminal subsystem 30 and an offset pointer for the application program 50. The offset pointers are used to put data into the buffer 15 and to remove data therefrom. Buffer 15 includes a variable size buffer ring which should be at least 34 bytes and preferably no larger than 64,000 bytes. The buffer ring is defined after the system goes into the monitored mode and will be discussed in greater detail below.

The previous discussion has defined the input path, i.e. how the input devices 41 get routed to the application program 50. That is, the data from the input devices 41, such as a keystroke, or movement of a locator (mouse) on a display screen, is input to the virtual terminal subsystem 30. The virtual terminal subsystem 30 deposits the data into the buffer ring of circular buffer 15. Once the data is in the buffer ring, the application 50 can remove this data at any time.

During monitor mode, when the application 50 is drawing a picture on a display 42, the data is sent directly from the respective application 50 to the display 42. The virtual terminal subsystem 30 has no knowledge of this direct data transfer. With the virtual terminal subsystem 30 out of the communication path, system performance is enhanced since many communication layers in the virtual terminal subsystem 30 are bypassed.

Figure 2:
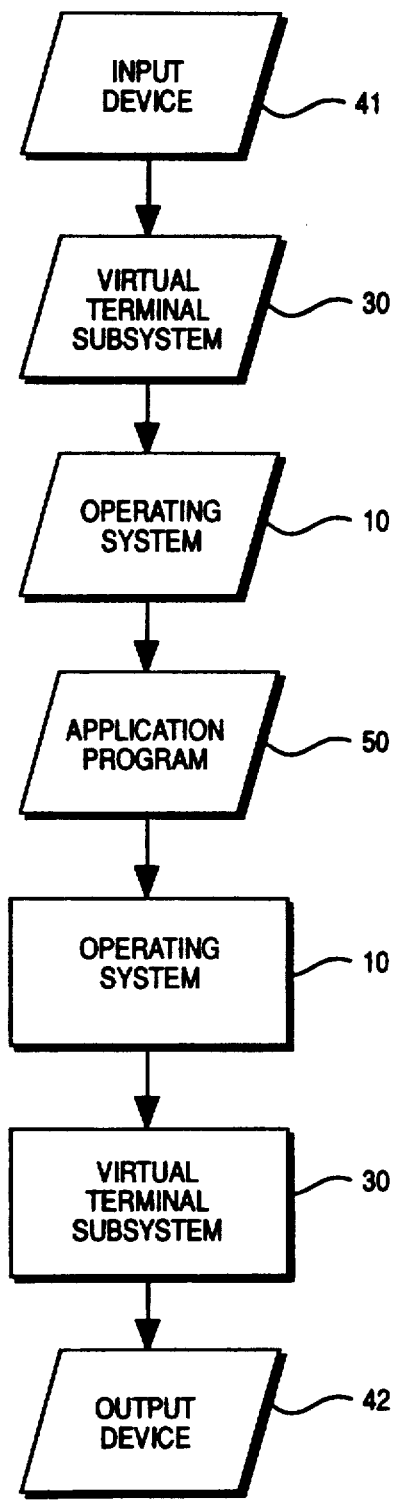
FIG. 2 is a diagram showing the flow of information used in a system in the mode of processing text.

The differences between the KSR and monitored mode as discussed above is best illustrated by FIGS. 2 and 3. FIG. 2 shows the path an input command must take prior to being displayed in the KSR mode, or non-monitor mode. First, the data is received from an input device 41 and sent to the operating system 10 via the virtual terminal subsystem 30. The application 50 accesses the input data from the operating system 10, and determines the corresponding output. Then the operating system 10 generates a command to be displayed on an output display device 42 and sends this command to the virtual terminal subsystem 30. The command to the display 42 then proceeds through the virtual terminal subsystem 30 and to the output device 42.

Figure 3:
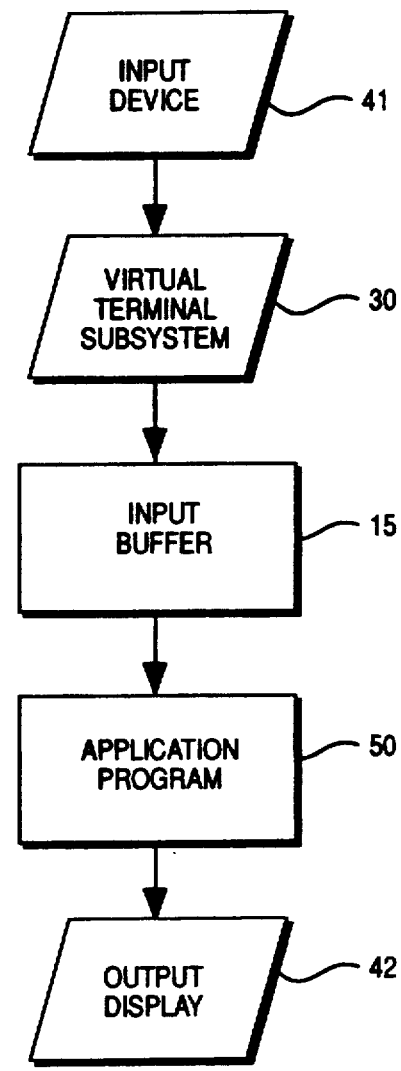
FIG. 3 is a diagram showing the flow of data used by the present system for writing to a hardware display in the monitored mode.

In contrast, FIG. 3. shows the path a command to the display 42 takes in the monitored mode. The virtual terminal subsystem 30 receives the data from the input device 41 and deposits the data into the input buffer 15. Once the data is in the input buffer 15, the application 50 can access this data at any time, and without the virtual terminal subsystem 30 knowing this data is being accessed. Next, the application 50 sends the data from the input buffer 15 directly to the output display 42.

In monitored mode the virtual terminal subsystem 30 is bypassed, and thus has no knowledge of the activity occurring between the application 50 and the output device 42. Therefore, the application 50 using this mode must actively participate by maintaining their own data presentation and facilitating transitions amoung the virtual terminals.

Applications 50 using monitored mode are also responsible for all input data tracking (keyboard, mouse, tablet, lighted program function keys, and dials). These applications 50 can specify the format protocol of keyboard input data that best suits their processing requirements. The protocol modes may be set to cause keystroke data to be converted into ASCII characters, control sequences, or to be returned as key positions, status, and scan codes. Applications 50 are also responsible for returning the keyboard and locator inputs.

In general, monitored mode will give the application 50 the flexibility of controlling the display hardware 42, optimizing the movement of data between the virtual terminal subsystem 30 and the application 50, and improving the performance of the system significantly by removing several layers of software between the application 50 and the display device 42. Of course, to achieve this flexibility, the application 50 must take a more active role in the management of display activity by increasing its level of involvement with the virtual terminal sybsystem 30 and display devices 42.

FIGS. 4-9 illustrate the application's 50 operation of the KSR and monitor mode. Although, any operating system 10 may be utilized, the operation is described in reference to a UNIX type operating system, or the like.

Figure 4:
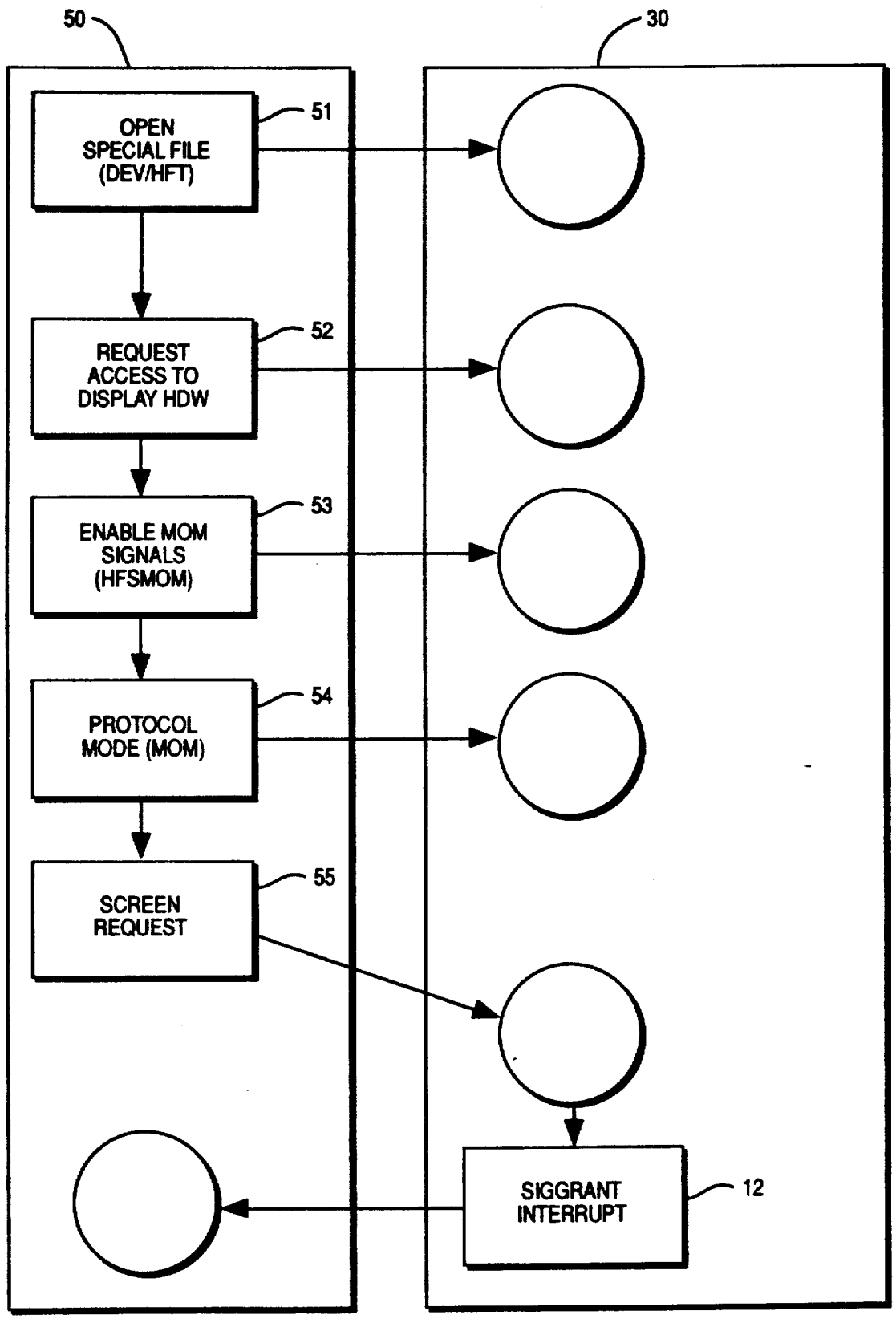
FIGS. 4–9 are charts illustrating the processes utilized by the present invention to allow a program application to directly access hardware display in a virtual terminal environment.

FIG. 4 shows the steps needed for an application 50 to open a new virtual terminal in the monitor mode. The communication interaction between the application 50, the operating system 10, and the virtual terminal subsystem 30 during these steps is also illustrated.

The first activity an application 50 initiates is opening a special file which is shown as step 51 (FIG. 4). Assuming, the application 50 chooses to run in monitor mode, it must request access to the display hardware (step 52). Next, the application 50 must enable the monitored mode (MOM) signals, step 53, which are received for the virtual terminal subsystems 30. Then, at step 54, the PROTOCOL MODE command from the application 50 to the virtual terminal subsystem 30 changes the mode from KSR to monitor mode if KSR was the initial mode. Step 55 is a screen request command that is sent from the application 50 to the virtual terminal subsystem 30, in order to define the input buffer 15 used in the monitored mode and gives the application 50 access of the display 42.

This screen request command 55 and the previous protocol command 54 puts the virtual terminal into monitor mode, and also give the application 50 the opportunity to either define or not define a buffer ring within input buffer 15. Whether or not, the buffer ring is defined, the screen request step 55, must be sent out to the virtual terminal subsystem 30. At this point the virtual terminal is in monitored mode, and the application 50 will receive a signal grant interrupt (SIG-GRANT) 12 from the virtual terminal subsystem 30. This informs the application 50 that it has complete control of the display adapter hardware 42 which is associated with the virtual terminal. From this point on, the application 50 can display whatever it chooses on the display of the physical output display 42.

Figure 5:
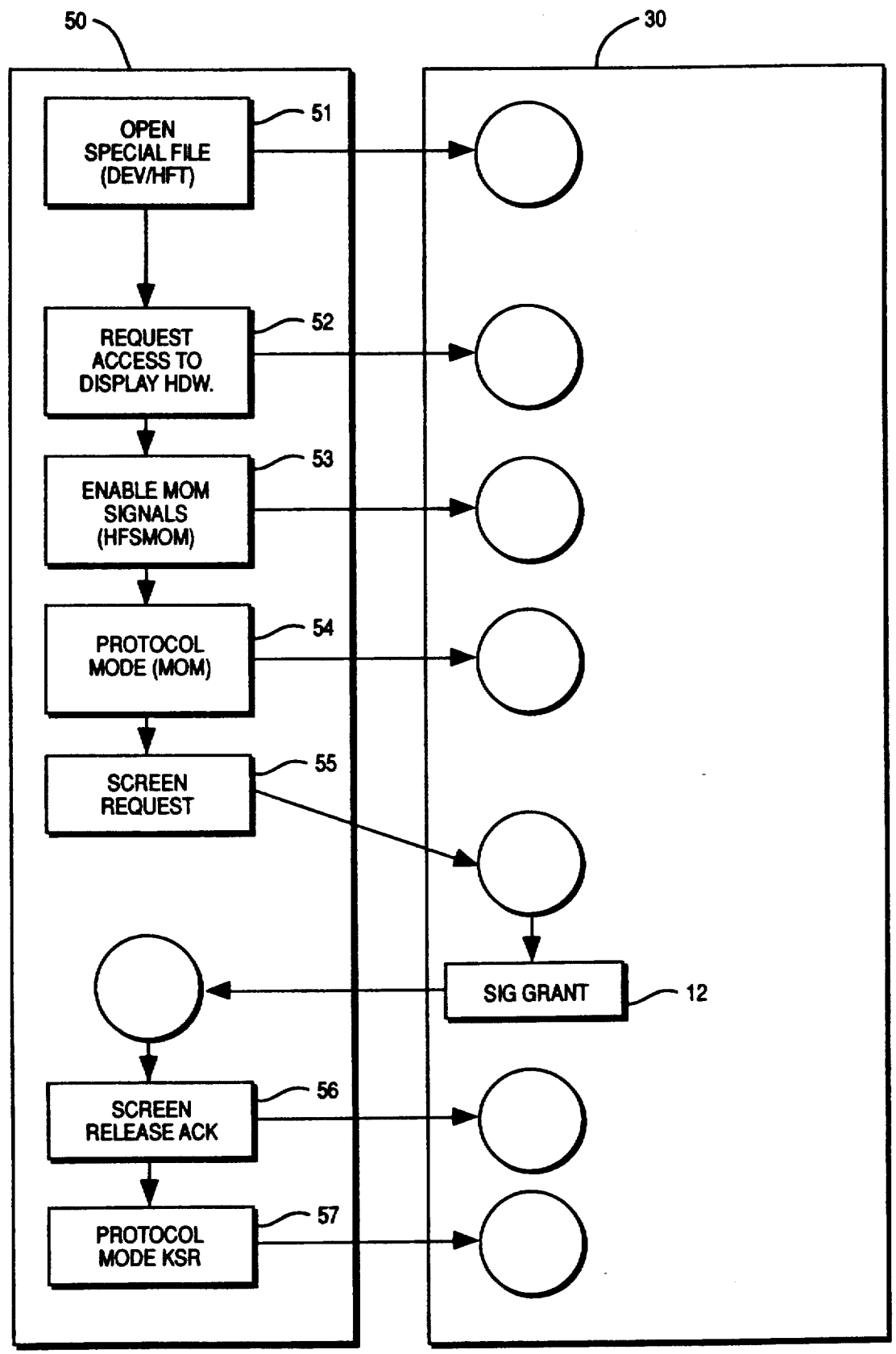

FIG. 5 illustrates the steps in opening a new terminal in monitored mode and then changing back to KSR mode on the same terminal. The step shown in FIG. 5 includes all the sequence of events in FIG. 4, i.e., opening a special file 51, requesting access to display hardware, step 52, enabling the monitoring mode signals 53, sending a protocol mode step 54 to put the virtual terminal in monitor mode, and requesting as screen 55. After the signal SIGGRANT 12 is received by the application 50, the virtual terminal is in monitor mode. If the application desires to put the virtual terminal in KSR mode, the application must send the command called screen release acknowledge (SCREEN RELEASE ACK), step 56 to the virtual terminal subsystem 30. Step 56 causes the virtual terminal to get ready to cease monitored mode operation. The application 50 must then send a protocol mode request step 57, to the virtual terminal subsystem 30 which changes the virtual terminal from monitored mode to KSR mode.

Figure 6:
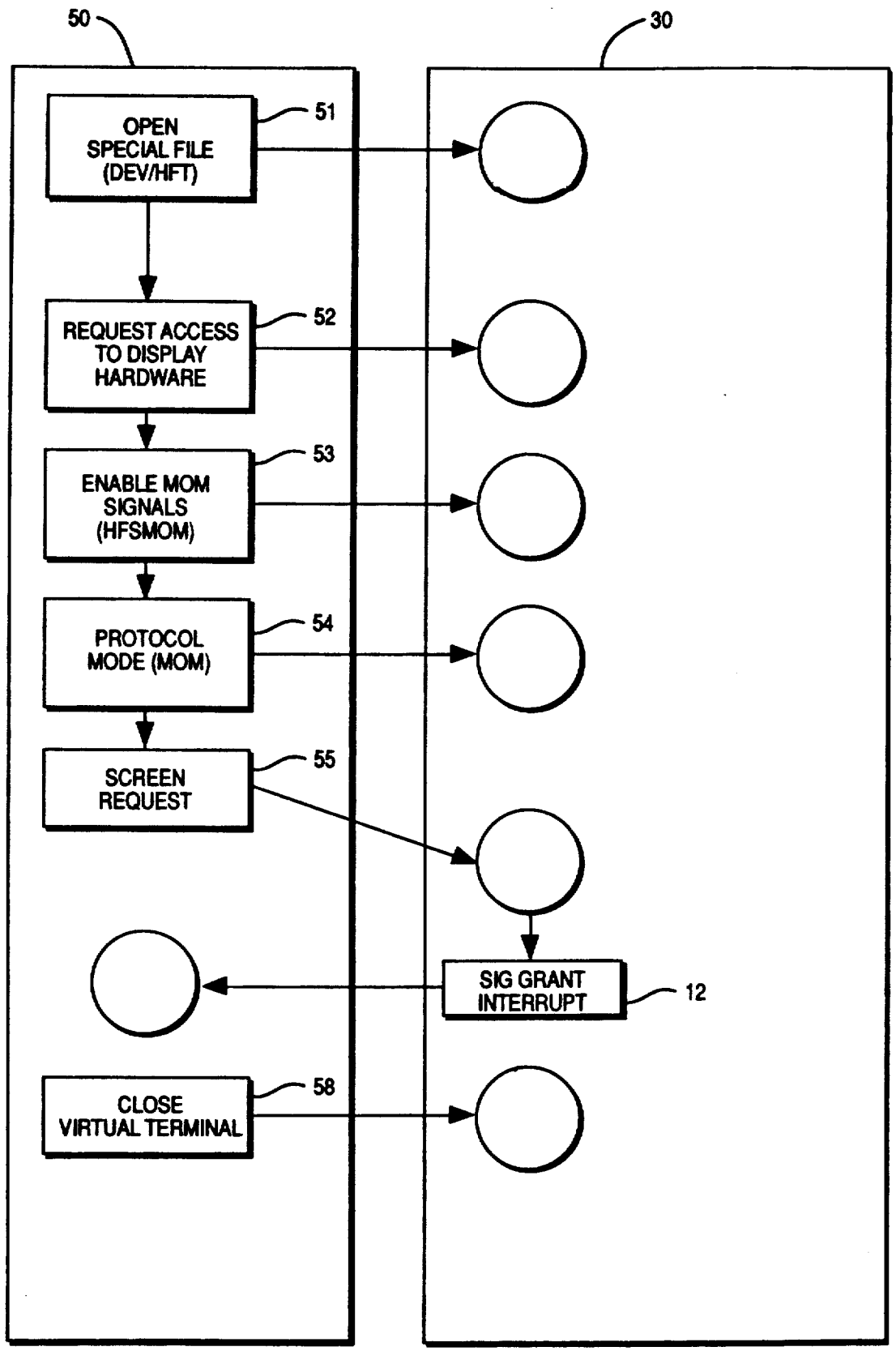

FIG. 6 illustrates the situation where a new virtual terminal is opened in monitored mode and the the virtual terminal is then closed. Again, the sequence of evens are the same as in FIG. 4. After the signal grant 12 is received by the application 50, the virtual terminal is in monitor mode. At this point, if the the application 50 chooses to close the virtual terminal, it may do so by sending a close virtual terminal command (CLOSE VT) step 58, to the virtual terminal subsystem 30. This removes the virtual terminal from the virtual terminal subsystem 30 process and closes the virtual terminal.

A virtual terminal that is running in the monitor mode may participate in a hot key sequence of the virtual terminal subsystem 30. Hot keying allows different virtual terminals which are opened to be displayed on the hardware display. The ability for a multiplicity of virtual terminals to share the same hardware display has been previously discussed.

The action key sequence on the keyboard, if implemented, will cause a virtual terminal screen to appear on the hardware display 42. If the action key is activated again, the next sequential virtual terminal screen will be displayed. This process is repeated with each activation of the action key (hot key operation). Once the key has been activated enough times such that each virtual terminal screen has appeared on the hardware display 42, the next activation of the action key will cause the virtual terminal screen that was first displayed to be displayed again. This, continuous scrolling of the virtual terminal screens on the hardware display 42 can take place with repeated activations of the hot key actions on the keyboard.

The virtual terminal subsystem 30 keeps a copy of the screen contents of all virtual terminals running in KSR modes. Upon activation of a virtual terminal running in KSR mode, the hot keying operation automatically restores a previously saved virtual terminal screen to the hardware display 42. The application 50 does not need to save the screen contents of virtual terminals running in KSR mode. Further, as the application does not need to save/restore the contents of the secreen, it is further releived of any need to keep track of the state of the virtual terminal it has open in KSR mode.

However, if a virtual terminal is running in monitor mode, and is participating in the hot key operation, the data must be saved before the virtual terminal relinquishes control of the display.

Figure 7:
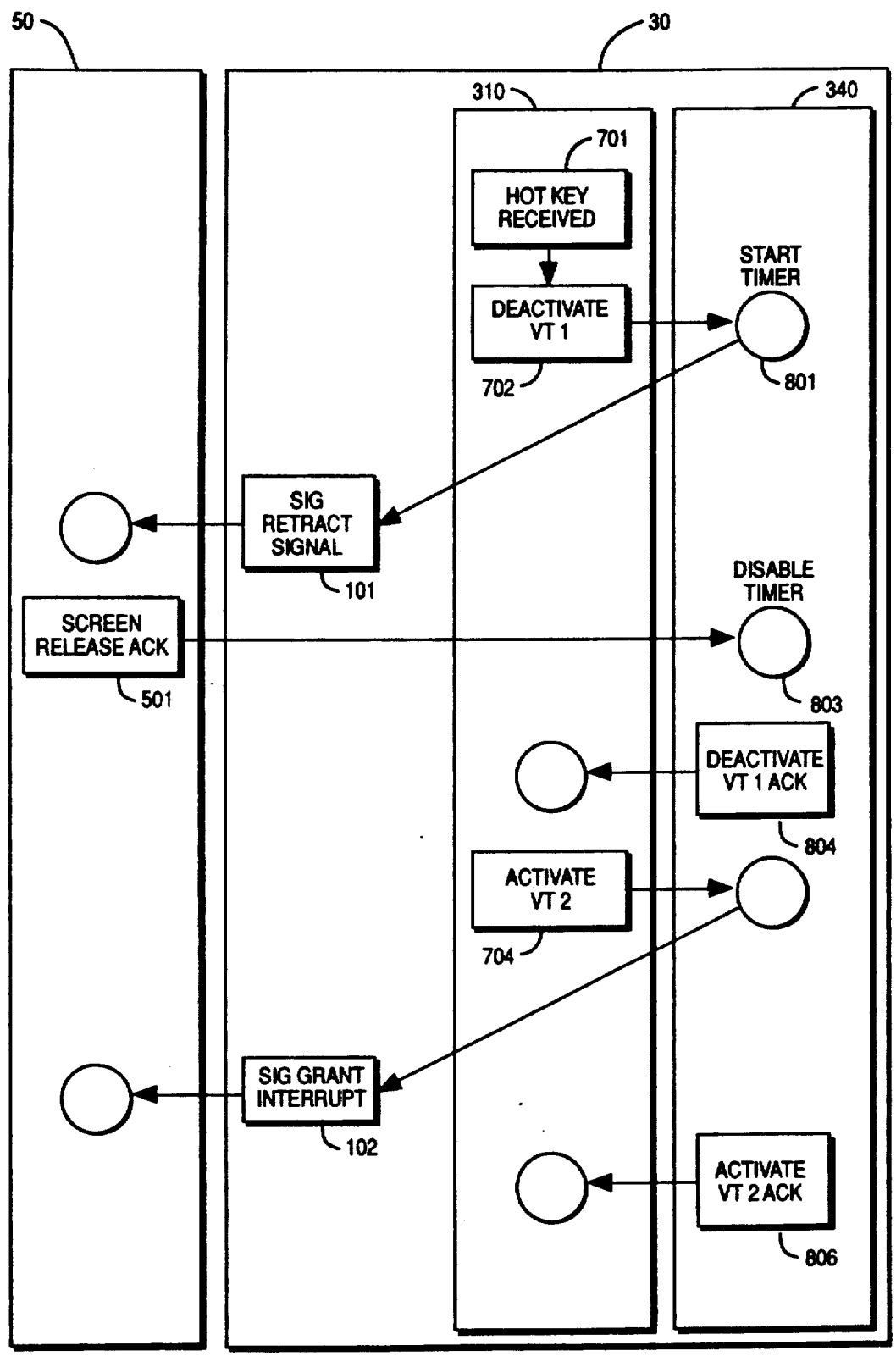

FIG. 7 shows the case where two terminals are opened, and they are both in monitored mode. If the action key is activated on the keyboard, the virtual terminal resource controller 310, which is part of the virtual terminal subsystem 30, as previously discussed receives the signal 701. The virtual terminal resource controller 310 sends a signal 702 to deactivate the virtual terminal. This starts a virtual resource controller timer 801 in the virtual terminal mode processor 340 of the virtual terminal subsystem 30, as described above. The timer is set for a specified period of time, such as 30 seconds.

The application 50 receives a screen release interrupt from the virtual terminal subsystem 30. In the form of a retract signal (SIGRETRACT). This SIGRETRACT informs the application 50 that it has a specified period of time, such as 30 seconds, to save all of the data, and to respond to the SIGRETRACT signal step 101. To respond to the SIGRETRACT signal 101, the application 50 sends a screen release acknowledge 501 to the virtual terminal subsystem 30. The screen release acknowledge 501 indicates to the virtual terminal subsystem 30 that the application 50 has acknowledged the fact that the hardware display 42 (presently being written to) must be released, and that the application 50 is ready to relinquish the display 42. The virtual resource controller timer is then disabled, at step 803.

At this point the virtual terminal subsystem 30 receives the screen release acknowledge 501. The virtual terminal subsystem 30 then implements a deactivate 804 and activate 704 process, which is internal to the virtual terminal subsystem 30. The application 50 has no knowledge of the existence of this process. The next application 50 will receive a SIGGRANT signal 102 from the virtual terminal subsystem 30 telling the application 50 running in the second virtual terminal, that it now has control over the display 42, which can be directly accessed by application 50. Thus, the ability of the first (deactivated) virtual terminal to communicate with the hardware display 42 has been removed, and the second (activated) virtual terminal has been given the opportunity to draw directly onto the hardware display 42.

Figure 8:
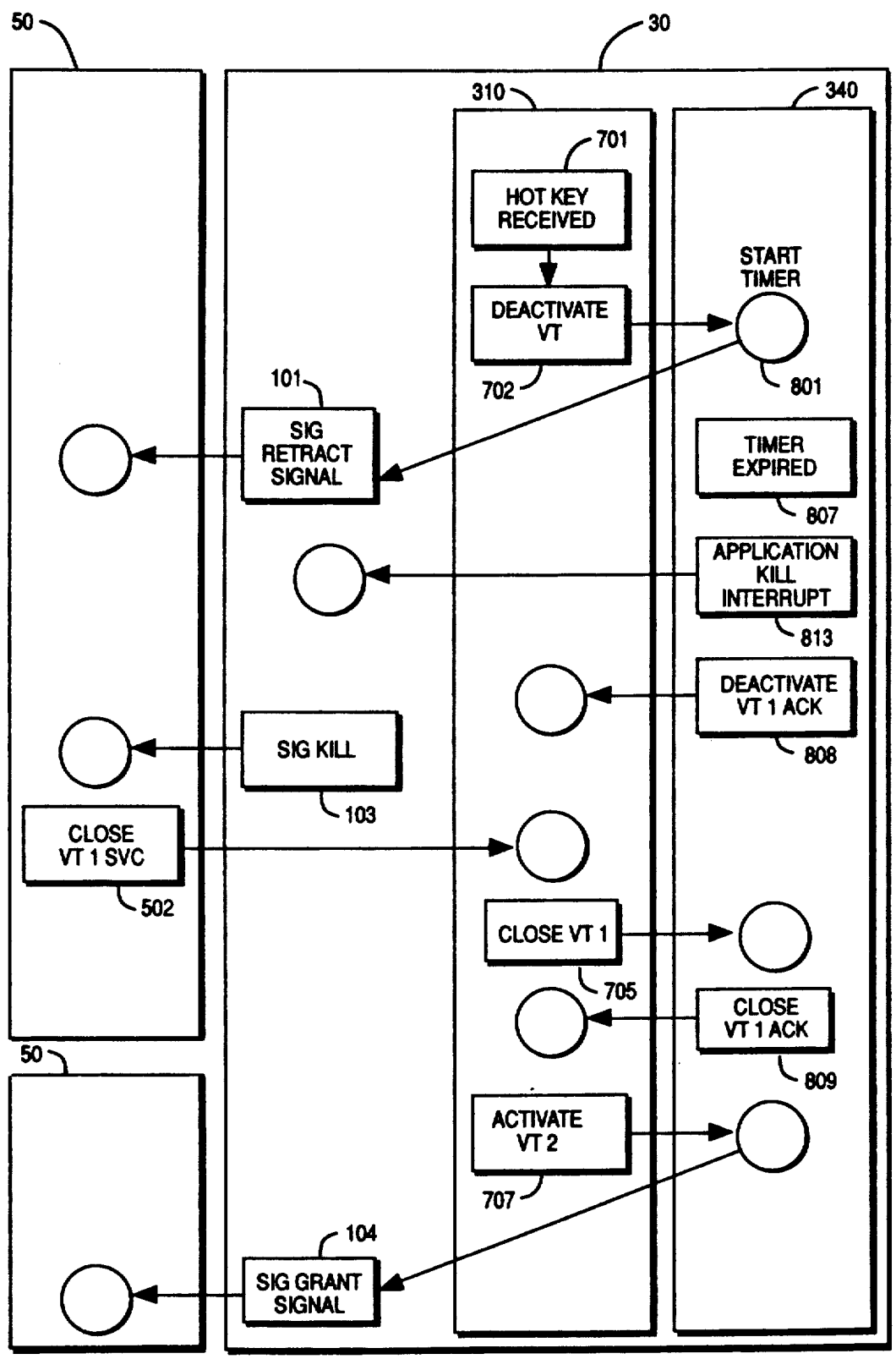

FIG. 8 illustrates the situation where two virtual terminals are in the monitor mode, and are going to participate in the hot key operation. However, in this situation the application 50 does not respond to the SIGRETRACT signal 101 within the designated amount of time. As shown in FIG. 8, the application 50 receives a SIGRETRACT signal 101 from the virtual terminal subsystem 30 since the keyboard action key sequence for hot keying has been initiated (step 701). If the application 50 does not respond to the SIGRETRACT signal within a designated time, e.g. 30 seconds, the timer in the virtual terminal subsystem 30 will expire at step 807.

Should the timer expire, the application 50 will receive a SIGKILL signal 103 from the virtual terminal subsystem 30 which indicates that the virtual terminal has expired, and that the virtual terminal subsystem 30 should close the virtual terminal. The virtual terminal is then removed from the virtual terminal subsystem 30. Therefore, after the SIGKILL processing 103, the non-responsive virtual terminal is closed (step 502). The virtual terminal subsystem 30 will then receive a close command and closes the virtual terminal by removing the process from the virtual terminal subsystem structures 310, 340 (steps 705 and 809).

Since in this example, there is a second virtual terminal which is being activated, the virtual terminal subsystem 30 knows about this second terminal, and activates (step 707) this second virtual terminal. Since the second virtual terminal is in monitored mode, a screen grant interrupt signal (SIGGRANT) will be sent by the virtual terminal subsystem 30 to newly activated virtual terminal's application 50. At this time, the newly activated virtual terminal has control of the display hardware 42.

Figure 9:
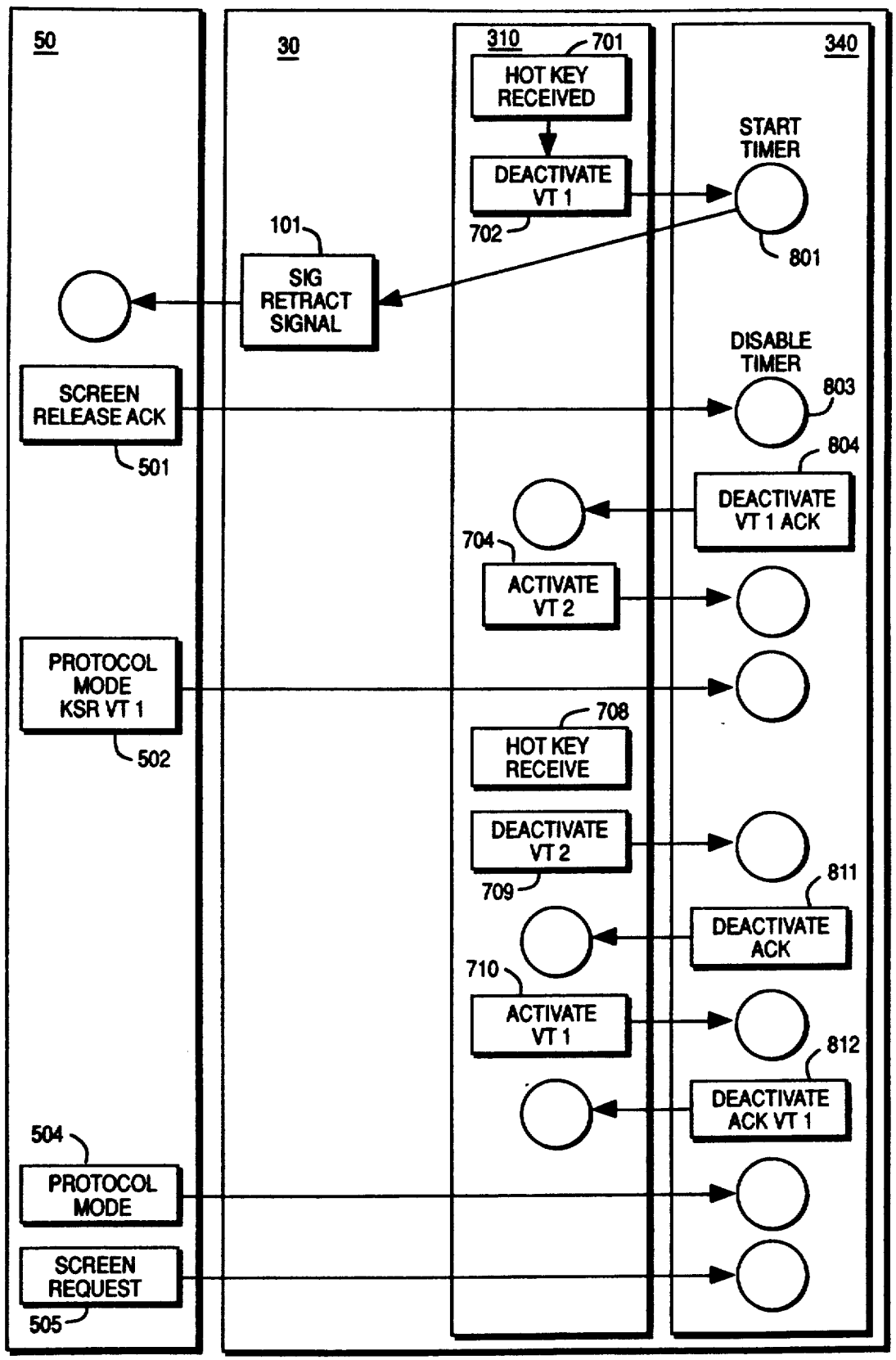

FIG. 9 represents the situation were two terminals are opened in KSR and monitor mode. The terminal in monitor mode is changed to KSR while it is in the inactivate step. This terminal is then reactivated in KSR mode and then its mode is changed to monitored mode.

In this case, it is important that the application 50 remembers that since the virtual terminal was in monitored mode, and then changed to KSR mode, the virtual terminal subsystem 30 has not retained any information regarding the monitor mode (this information was retained by the corresponding application 50). Therefore, the application 50 has to define another circular input buffer 15 and reset all of the associated pointers before the switch from KSR to monitored mode can be accomplished. This is true even if a previous circular buffer 15 was defined when the virtual terminal was first in monitored mode and then switched to KSR mode. The circular buffer 15 disappeared when the monitor mode was switched to KSR mode. Therefore, the situation in FIG. 9 illustrates that the protocol mode, (step 504) and the screen request (step 505) have to be sent, in sequential order, every time a terminal is to be placed into monitored mode.

The present invention will now be described with reference to FIG. 10 which is a block diagram showing the elements of a virtual terminal system. Three applications 50a, 50b and 50c are shown which are capable of writing directly to display devices 42a, 42b and 42c in the monitor mode, as previously discussed. These applications taken together, are shown as having opened six virtual terminals depicted by reference numerals 31, 32, 33, 34, 35 and 36. The number of virtual terminals opened per application will never be greater than the total number of physical displays 42 in the computer system, however, an application 50 may open less virtual terminals than there are available displays. It can be seen that a greater number of total virtual terminals (e.g. six in FIG. 10) can be opened than there are total physical display devices (e.g. three is FIG. 10). Therefore, a mechanism must be utilized which will allow the virtual terminal subsystem (VTSS) 30 to allocate the displays 42 between the applications 50 requesting their use.

Prior art virtual terminal systems operate such that when a user of a computer system initiated a "hot key" sequence, the currently active virtual terminal becomes deactivated and the next successive virtual terminal becomes activated. Thus, a problem exists in that a user may only be hot keying between virtual terminals, rather than between multiple program applications 50. To solve this problem the present invention designates all but one of the multiple virtual terminals opened by a single application 50 as "non participating" in any hot keying operations.

Figure 10:
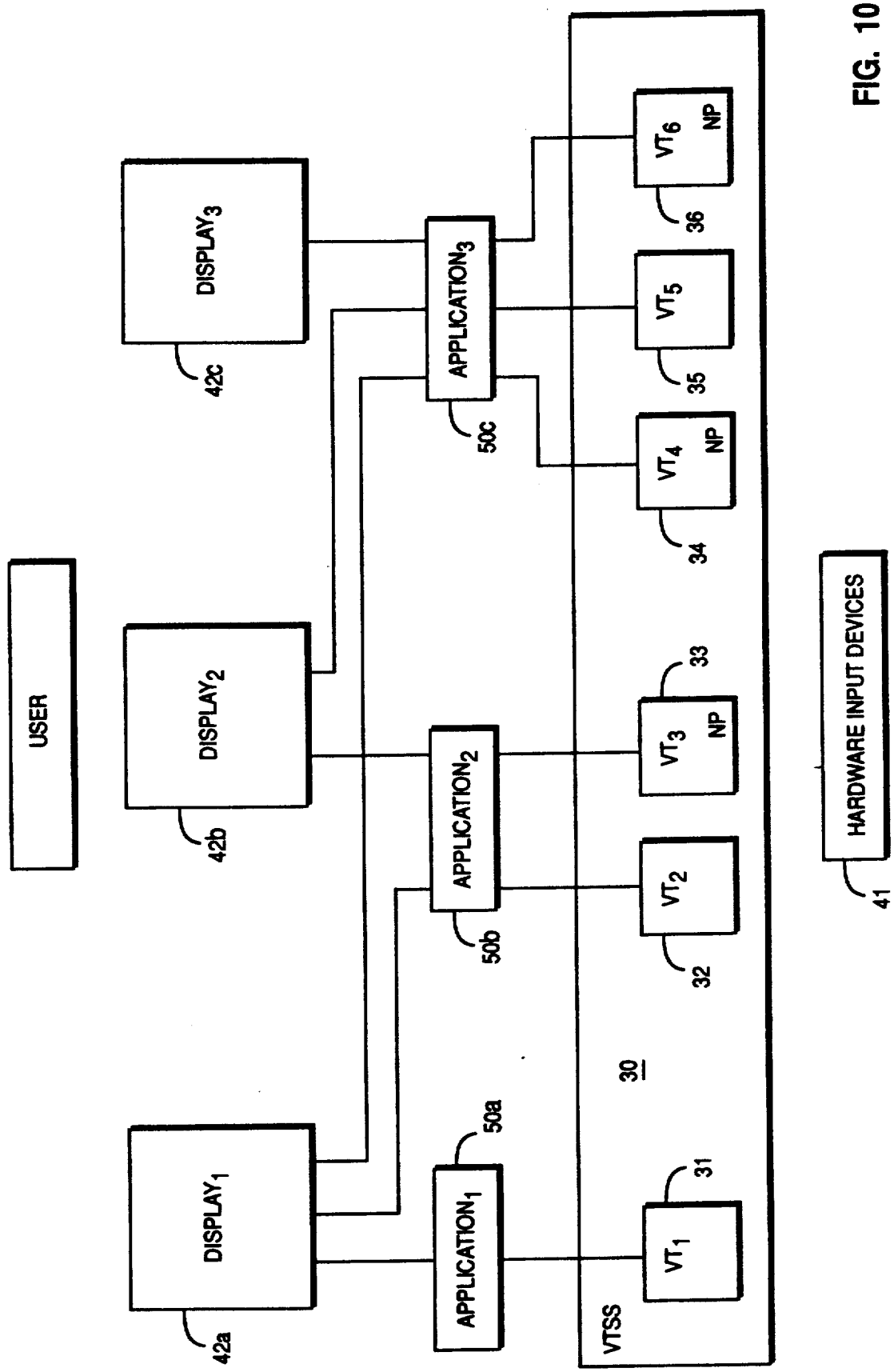
FIG. 10 is a block diagram depicting an example of the various components and their relationship with one another in a virtual terminal environment of the present invention.

The initialization of an application 50 for use in the system of the present invention, as depicted in FIG. 10, will now be described with reference to FIGS. 12a, 12b and 12c, which are flow charts representing these initialization steps. It should be noted that this process is utilized for each one of the applications 50a, 50b and 50c shown in the system of FIG. 10. It should be noted that with the use of this initialization process, any application 50 can be utilized in the system of the present invention. It is not necessary to use only those applications 50 capable of managing multiple virtual terminals and hardware displays 42.

At step 1 (FIG. 12a), the initiation process begins for the application 50 being used in the system of FIG. 10. The application 50 queries the VTSS 30 to determine the number of physical displays 42 present in the system of the present invention (step 2). Next, the process determines if the number of displays 42 present is less than the number of displays 42 needed by the application 50 (step 3). If the number of displays 42 present is less than the number of displays 42 needed by the application 50, then an error has occurred and the process exits at step 4. If, however, the number of displays 42 present is greater than, or equal to, the number of displays 42 required by the application 50, then the process continues to step 5 where the virtual terminals needed by the application 50 are opened in a manner as previously described.

At step 6, the VTSS 30 uses an input/output control system call (IOCTL) to designate all but one of the virtual terminals as "non participating" in any hot keying operations. The IOCTL allows the application 50 to tell VTSS 30 which of the virtual terminals should not participate in the hot key operation. The process then associates each opened virtual terminal with a different physical display 42, at step 7. Again, an IOCTL is used by the application 50 to tell the VTSS 30 which display 42 the application 50 wishes to associate with each opened virtual terminal.

Step 8 sets up signal handlers within application 50 such that the SIGGRANT and SIGRETRACT signals, from VTSS 30 can be received and processed. Signal handlers are well known in the art and often referred to as interrupt handlers. Therefore, further detail regarding the creation of these signal handlers is not required for one skilled in the art to understand the present invention. The process of FIG. 12 then designates all physical displays 42 as "not available" for initialization purposes (step 9 of FIG. 12b). In this way, an application 50 cannot begin writing to a display without VTSS 30 first granting permission. Again using IOCTLs the application 50 requests a monitored mode operation from the VTSS 30, at step 10. The application 50 then requests, at step 11, direct hardware level access to the required display devices 42 by invoking an AIXGC system call, to the VTSS 30, which is a part of the AIX (AIX is a trademark of the IBM Corporation) operating system. Step 12 requests, from VTSS 30, access to a physical display 42 for the virtual terminal which has been designated as participating in the hot keying operation. Once again, an IOCTL is used to make this request. At this time VTSS 30 designates any displays 42 to which access is to be granted as "available." Step 13 performs any other start up procedures a particular application may require. Step 14, then determines whether the particular application 50 has been terminated. If so, the process ends at step 15. However, if the application remains active, then all normal application inputs are processed at step 16. At step 17, the process determines whether there is any data output from application 50 that is awaiting display on a display device 42 which has been designated as "available." If there is output pending, or awaiting display, then the display 42 is updated, at step 18. However, if there is no output pending for an available display, then the application 50 returns to step 16, where it is again determined if the application has terminated. Subsequent to updating the display at step 18, the process also returns to step 16.

An example of the mechanism of the present invention which ensures that each hot key operation will allow the users focus to shift to the next successive application, will now be described with reference to FIGS. 10 and 11. Assume, for the purposes of this example that the VTSS 30 has already opened the virtual terminals 31, 32, 33, 34, 35 and 36 in a manner as previously discussed and that each application 50a, 50b, and 50c (applications 50b and 50c being multiprocess applications) has undertaken the initialization process discussed immediately above with reference to FIGS. 12a, 12b and 12c. Next, a certain initial steady state condition for the system of FIG. 10 must be assumed. For example, assume the following: (1) virtual terminals 33,34 and 36 have been designated by application 50b and 50c as not participating in a hot key operation (step 6 of FIG. 12a); (2) application 50a is active and writing directly to display 42a in monitored mode; (3) application 50b is requesting permission from VTSS 30 to write directly to display 42a, since this display corresponds to the virtual terminal 32 which is participating in hot keying; and (4) application 50c actively writing to displays 42b and 42c in monitor mode.

FIG. 11 is a chart summarizing this assumed initial state, however it should be noted that many other steady state conditions could be assumed without departing from the scope of the present invention. Additionally, FIG. 11 shows the condition of each application 50a, 50b and 50c after each hot key operation, performed during this example. It should be noted that each hot key sequence shifts focus between each successive application 50, i.e. the sequence is from 50a to 50b to 50c and back to 50a.

Initially, the user executes a hot key sequence on input device 41. It should be noted that for the purposes of this example that virtual terminals 31, 32 and 35 are assumed to be participating in the hot keying operation (step 6 of FIG. 12a). After the hot key operation the application 50a receives a SIGRETRACT from VTSS 30 since virtual terminal 31 is active and application 50a is directly displaying data in the monitor mode to display 42a. The signal handler, set up in application 50a in step 8 of the initialization process receives the SIGRETRACT signal and performs the processing shown in FIG. 14 (this process assumes the signal handler has been set up in the application 50 by the initialization process).

Figure 14:
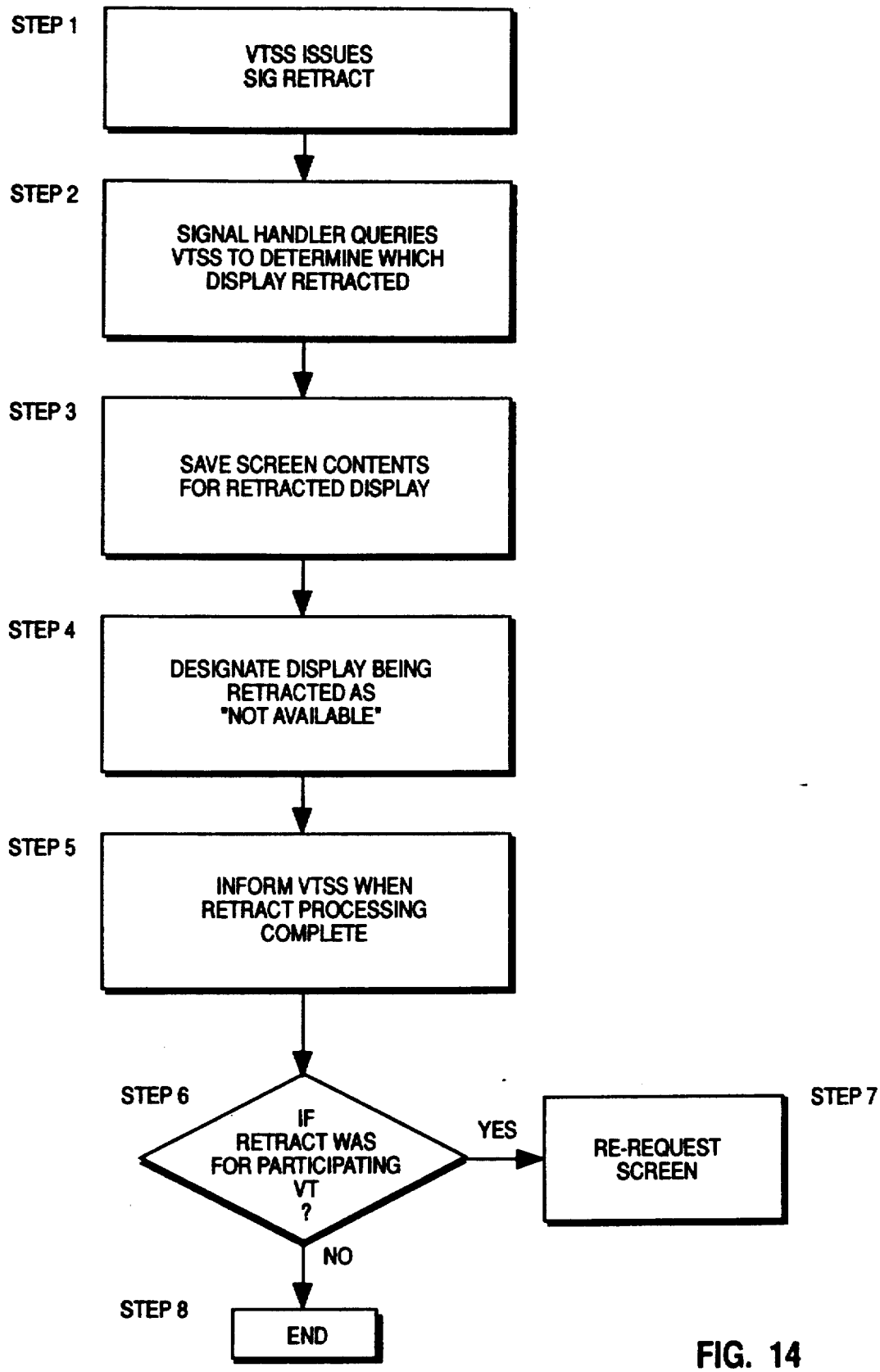
FIG. 14 is a flow chart showing the processing steps required when a SIGRETRACT is received by an application program.

At step 1 of FIG. 14, the SIGRETRACT signal handler set up by application 50 receives the SIGRETRACT signal, from VTSS 30. The signal handler then uses an IOCTL to query the VTSS 30 to determine which display device 42 is being retracted (step 2). It must be noted that the prior art AIX operating system provides for SIGRETRACT signals, however an application 50 running under the prior art AIX is unable to determine which display has been retracted.

Step 3 saves the contents of the screen on the display 42 being retracted. These screen contents are saved by application 50 on an "as needed" basis. That is, information which is not required when the application 50 once again becomes active is not saved. The display 42 is then designated as being "not available" to be written to by application 50 (step 4). At step 5, the signal handler within application 50 informs the VTSS 30 when all SIGRETRACT processing is complete. The process then determines, at step 6, if the retract processing was implemented for the virtual terminal participating in hot keying. If so, then the signal handler re-requests permission for the application 50 to write directly to the screen which has just been retracted (step 7). However, if the SIGRETRACT was for a virtual terminal not participating in hot keying, then the SIGRETRACT processing ends at step 8. It should be noted that this process is implemented every time, the VTSS 30 sends a SIGRETRACT signal to an application 50 and will be implemented on numerous occasions throughout the remainder of this which is example being explained with regard to the present invention and referencing FIG. 10.

Continuing with this example, assume application 50a has just completed SIGRETRACT processing, as discussed above and has returned an acknowledge signal to VTSS 30 and has now been placed in a "requesting state" since virtual terminal 31 has been designated as participating in hot keying (see steps 6 and 7 of FIG. 14). The hot key operation causes VTSS 30 to initiate steps to activate virtual terminal 32, which is the next virtual terminal designated as participating in hot keying. After VTSS 30 receives the acknowledgement of the SIGRETRACT signal, a SIGGRANT signal is issued to application 50b regarding the activation of virtual terminal 32. The signal handler within application 50b then processes this SIGGRANT in the manner depicted by the process of FIG. 13.

Figure 12A:
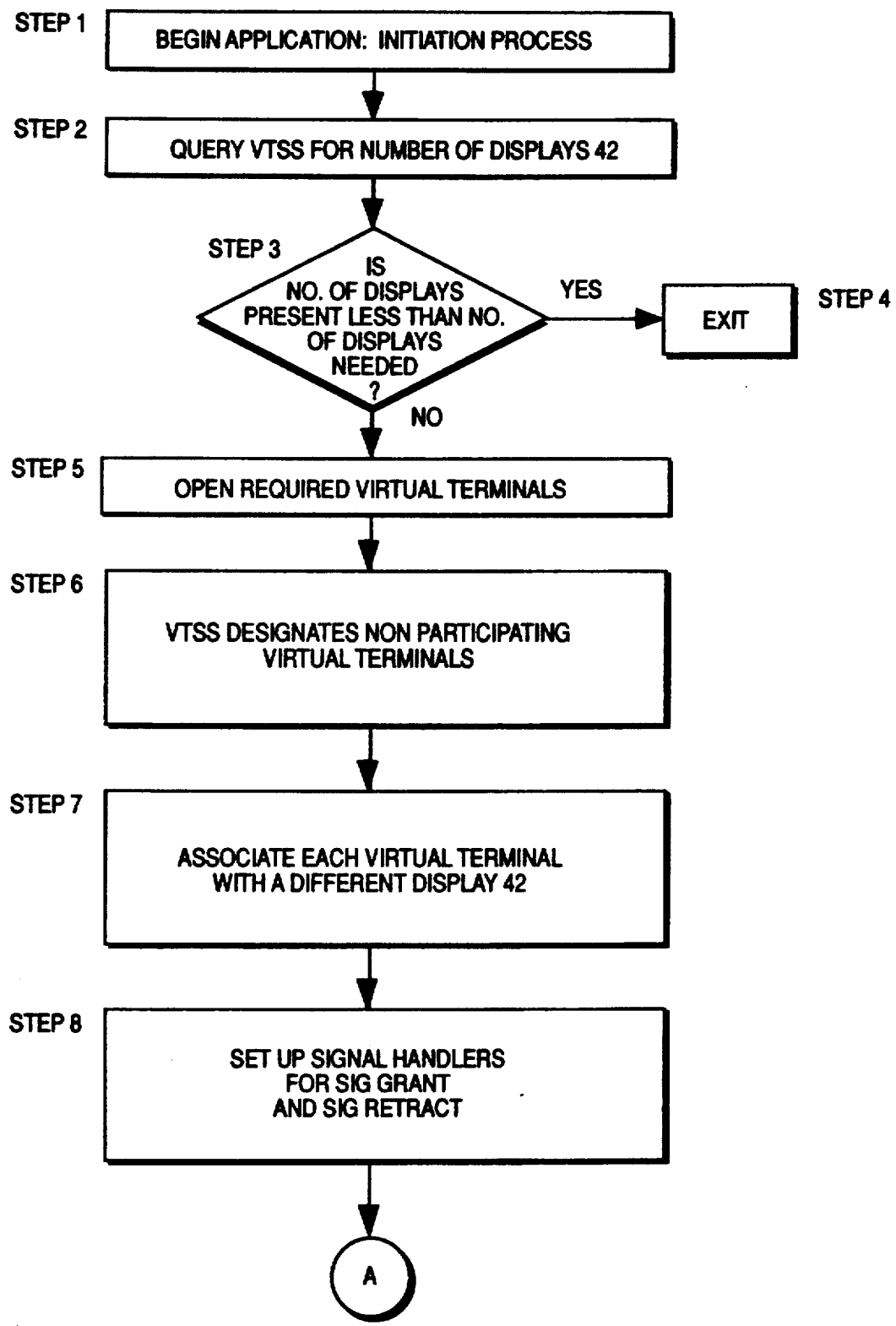
FIGS. 12A, 12B and 12C are flow charts showing the initialization process for each program application.
Figure 12B:
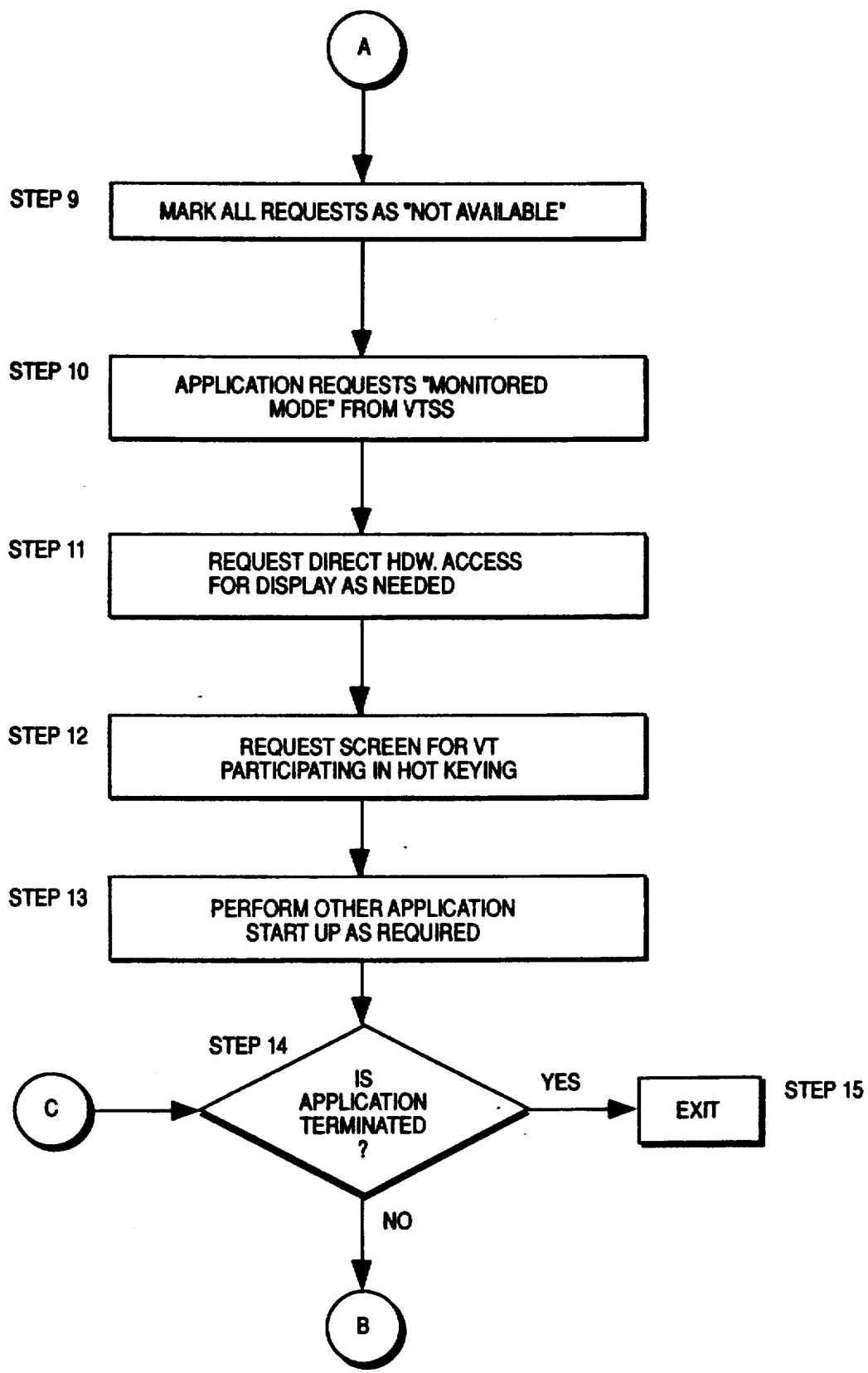
Figure 12C:
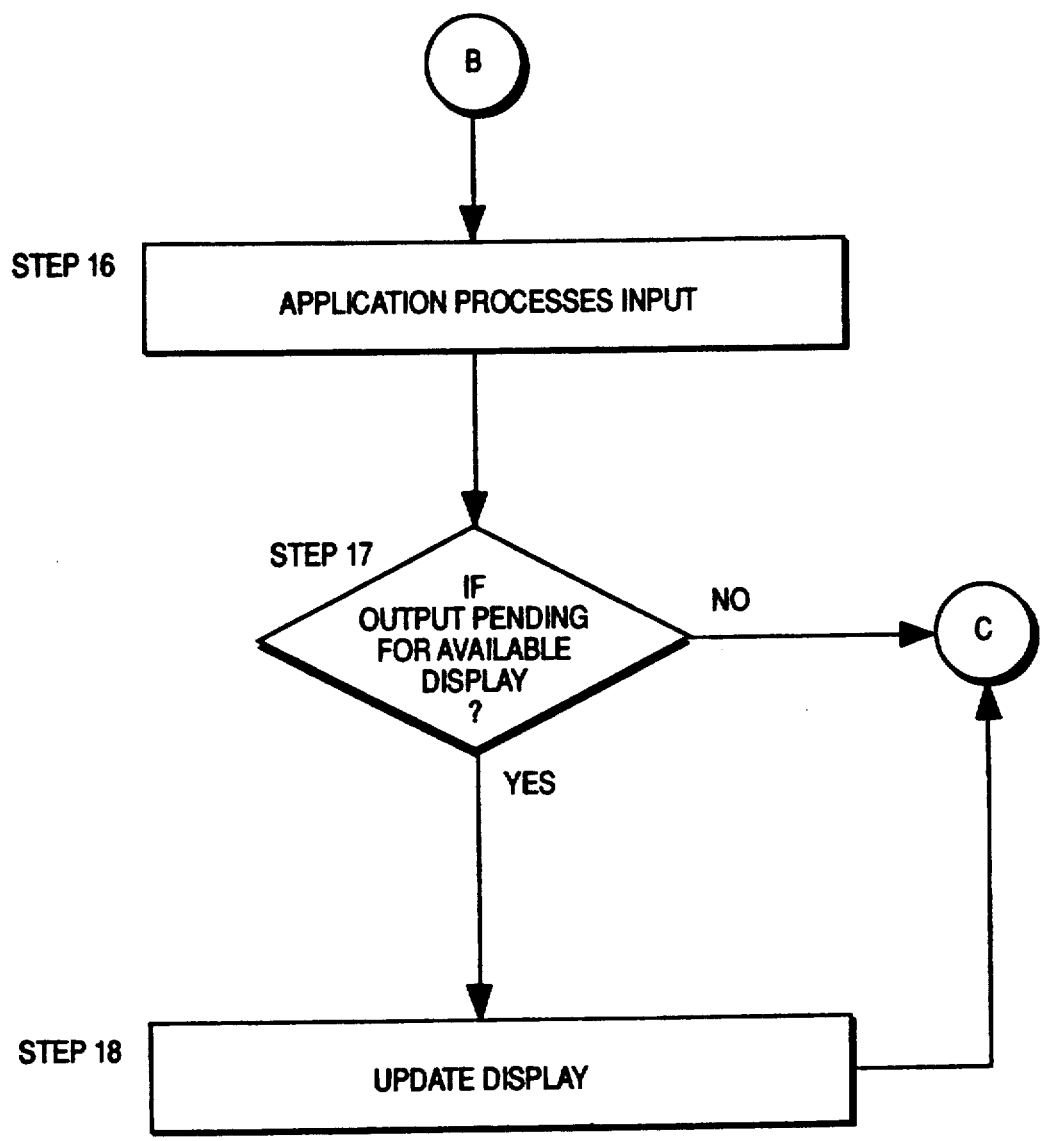
Figure 13:
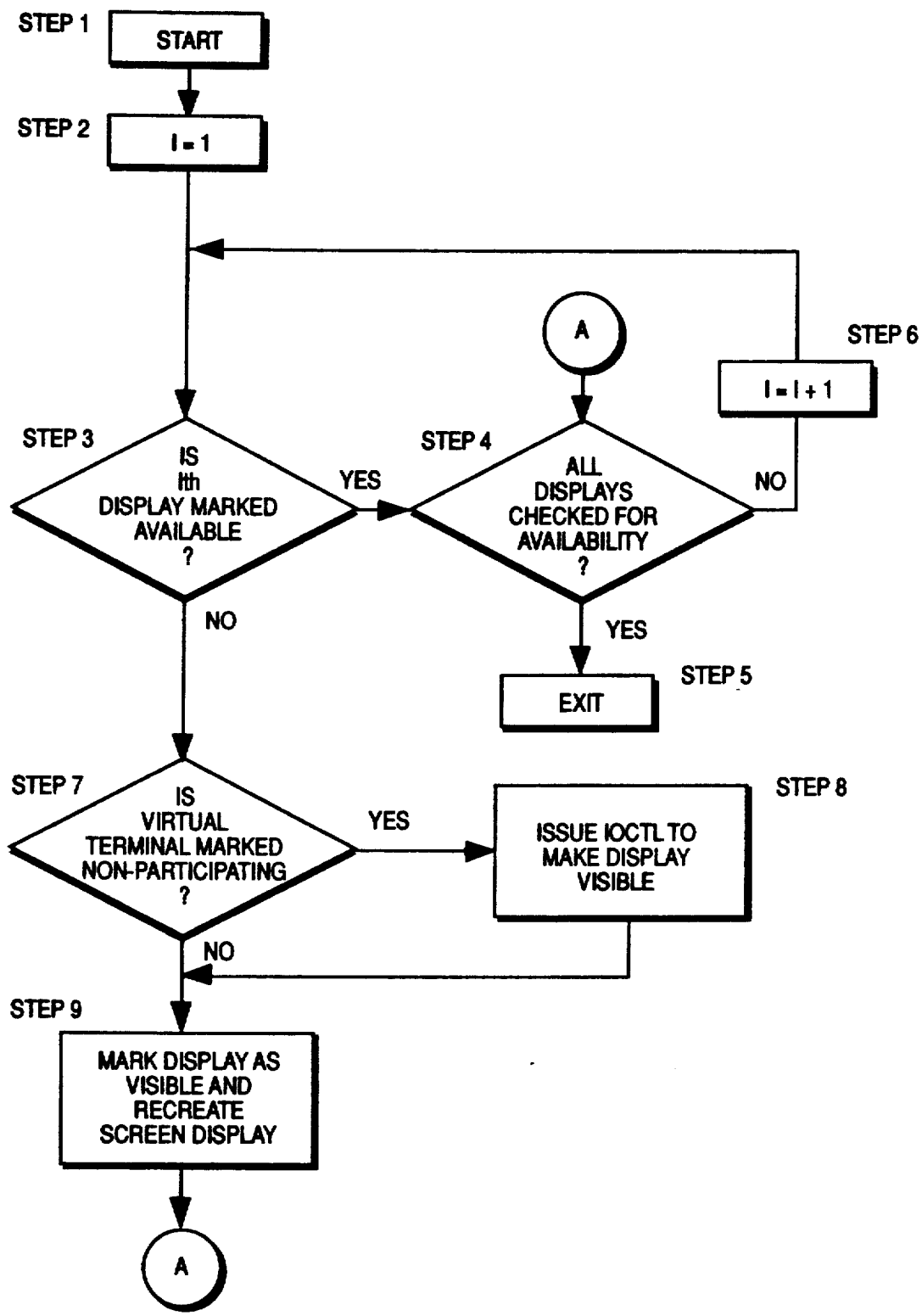
FIG. 13 is a flow chart illustrating the steps required for SIGGRANT processing.

FIG. 13 is a flowchart representing the steps involved in processing a SIGGRANT signal received by the signal handler of an application 50 (FIG. 12a, step 8). At step 1 of FIG. 14, the signal handler receives the SIGGRANT signal from the VTSS 30 and starts this process. At step 2, the process is initialized by designating I as the number of displays available and setting it equal to one. Step 3 determines whether the Ith display 42 is designated as "available" or "not available" (see step 9, FIG. 12b). If the display 42 is available then the process continues to step 4 where it is determined if all displays have been checked for availability. If so, then the process ends at step 5. However, if at step 4 it was determined that not all displays have been checked for availability, then the process redesignates the display 42 to be checked for availability by setting the display to be considered as I=I+1 (step 6). After this redisgnation, the process returns to step 3. If at step 3 the display being considered is not marked as available, then it is determined at step 7 whether the virtual terminal being considered has been designated as non participating. If so, then the application 50 issues an IOCTL to the screen manager 320 of VTSS 30 to make this display visible (step 8). However, if the virtual terminal is one that is not marked as non participating, then the display 42 is marked as visible and the screen display is recreated (step 9). Subsequent to step 9, the process returns to step 4 to determine whether all displays have been checked for availability.

With regard to the present example, SIGGRANT processing is completed by the signal handler within application 50b after VTSS 30 receives an acknowledge signal from application 50a. Therefore, due to the hot key operation, application 50b has been granted access to write directly to display 42a in the monitor mode. Next, application 50b requests that the non participating virtual terminal 33, which was opened by application 50b, become visible such that application 50b can also write directly to display 42b in monitor mode. This request is made by application 50b to the VTSS 30 and the screen manager 320 included therein. The VTSS 30 and application 50b then go through the identical steps required to open a virtual terminal in the monitor mode, as discussed previously with reference to FIG. 4. Non participating virtual terminal 33 is then made visible (FIG. 13, steps 7 and 8) and display 42b is granted, enabling application 50b to directly write to this display 42b in monitor mode.

Application 50c, which was directly writing to displays 42b and 42c now receives a SIGRETRACT from VTSS 30 for display 42b, since application 50b has been the subject of a hot key operation and is requesting display 42b. After SIGRETRACT processing, application 50c then re-requests display 42b (FIG. 14, step 7), because this display corresponds to the virtual terminal 35 of application 50c which has been designated as participating in hot keying. The status of display 42c is not affected by this (initial) hot key sequence since application 50c is the only application desiring to write thereto. Therefore, application 50c is still directly writing to display 42c in monitor mode.

To summarize the status of the subject example, after the initial hot key operation, application 50a is requesting access to display 42a, application 50b is writing in the monitor mode to displays 42a and 42b, and application 50c is requesting access to display 42b and is writing directly to display 42c in the monitor mode.

Next, assume the user performs a second hot key operation on input device 41. The VTSS 30 then deactivates virtual terminal 32 and activates the next participating virtual terminal 35, by skipping non participating virtual terminals 33 and 34. The activation of virtual terminal 35 occurs in a manner as previously discussed with reference to FIG. 11A.

The VTSS 30, as previously discussed, must include a mechanism which allows the VTSS 30 to select the next participating virtual terminal to be activated. Should the next successive virtual terminal be designated as non participating, then the VTSS 30 skips to the next successive virtual terminal which has not been designated as non participating.

Under the facts assumed for the current example virtual terminals 33 and 34 have both been designated as non participating. Therefore, VTSS 30 skips over virtual terminal 33 and 34 to virtual terminal 35. Due to the activation of virtual terminal 35, application 50c, which has been requesting display 42b, is now the subject of a hot key operation. A SIGRETRACT is now issued by VTSS 30 to application 50b for display 42b. After relinquishing display 42b, application 50b then returns an acknowledgement to VTSS 30. Next, a SIGGRANT is issued to application 50c granting direct access to display 42b. At this time, application 50c then requests display 42a from screen manager 320 of VTSS 30 since this is the only remaining display to which application 50c does not have access. The VTSS 30 then issues a SIGRETRACT to application 50b for display 42a. After SIGRETRACT processing and sending an acknowledgement, application 50b requests display 42a (FIG. 14, step 7). Subsequent to receipt of the acknowledgement, VTSS 30 issues a SIGGRANT to application 50c for display 42a. It should be noted that the SIGGRANT and SIGRETRACT processing occurring within the signal handlers of applications 50b and 50c are identical to the processing described with regard to FIGS. 13 and 14. There is no change in status with regard to display 42c since application 50c is the only one desiring to write thereto, and application 50c was already actively writing to this display in the monitored mode, prior to the second hot key operation.

Therefore, referring to FIG. 11, after the second hot key operation, the applications 50a, 50b, and 50c are in the following states: application 50a remains in a state of requesting access to display 42a; application 50b has had both displays 42a and 42b taken away (retracted), due to the hot key operation to application and is now requesting display 42a; and application 50c now has access to all three displays 42a, 42b and 42c, and is capable of directly writing to these displays in the monitor mode. Application 50c was able to take both displays 42a and 42b from application 50b, due to this hot key operation and subsequent related SIGRETRACT (to application 50b) and SIGGRANT signals (to application 50c) issued by the VTSS 30. Also, application 50c was previously writing directly to display 42c and the hot key operation did nothing to change this state.

Another hot key operation will now be described wherein the user initiates the sequence on input device 41 and VTSS 30 knows to deactivate virtual terminal 35, skip non participating virtual terminal 36 and proceed to virtual terminal 31, which is the next participating virtual terminal. It should be noted that the sequence of the virtual terminals can be in any desired order, however for the purposes of this example, it is assumed to be a scrolling pattern from virtual terminal 31 to virtual terminal 36 in sequential order and then returning to virtual terminal 31. However, any sequence would work, e.g. virtual terminal 36 to virtual terminal 31 in decreasing sequential order and then returning to virtual terminal 36.

The signal handler of application 50c then receives a SIGRETRACT signal from the VTSS 30 for display 42a and sends an acknowledgement to VTSS 30 after this processing is completed. Subsequent to receipt of the acknowledgement from application 50c, VTSS 30 issues a SIGGRANT to application 50a for display 42a. After SIGGRANT processing by application 50a, display 42a may be written to in monitor mode by application 50a (i.e. application 50a is active on display 42a).

Thus, virtual terminal 35 has been deactivated and virtual terminal 31 has been activated by this third hot key operation. However, it is not necessary to retract displays 42b and 42c from application 50c since application 50a is not requesting displays 42b and 42c, only 42a which has previously been granted thereto by the issuance of a SIGGRANT signal from VTSS 30. Thus, it can be seen from FIG. 11 that application 50a is now writing to display 42a in the monitor mode, application 50b remains requesting access to display 42a, and application 50c is writing to displays 42b and 42c in monitor mode. Again referring to FIG. 11, it can be seen that the state of the applications 50a, 50b and 50c with respect to displays 42a, 42b and 42c is exactly the same after the third hot key operation, as it was at the initial assumed state.

Therefore, it can be seen how the present invention allows each and every hot key operation initiated by a user of a system, including multiple application having the ability to directly write to multiple displays will always change the subject of the display devices from one application to the next, not from one virtual terminal to the next, as provided by prior art systems. It can also be seen that the application 50 which is the subject of the hot key operation will always have access rights to display devices for all of the processes contained therein which desire to write directly to the displays. The previously described example is not intended to limit the present invention to a system as depicted in FIG. 10. Any system utilizing a plurality of applications with at least one application capable of writing directly to plural hardware display devices is contemplated by the scope of the present invention.

Although certain preferred embodiments have been shown and described, it should be understood that many changes and modifications may be made therein without departing from the scope of the appended claims. For example, the present invention would enable one skilled in the art to derive the benefit thereof for a system having a configuration wherein a first application is capable of writing to a first display device and another program application is capable of directly writing to the first display and at least one other display device.

What is claimed is:

1. A method of shifting the focus between program applications, by implementing a single shifting operation, aid method comprising the steps of:
    providing a plurality of hardware display devices;
    providing a plurality of said program applications each corresponding with and writes directly to at least one of said hardware display devices;
    providing a plurality of virtual terminals, each of said virtual terminals being associated with a particular one of said plurality of program applications and at least one of said plurality of program applications having more than one said virtual terminal associated therewith, each said virtual terminal directly corresponding to one of said hardware display devices;
    designating all but one of said virtual terminals, associated with a particular one of said plurality of applications, as non participating in said shifting operation; and
    shifting, in a single operation, the focus from a first one of said plurality of program applications to a successive one of said program applications, thereby allowing said successive application to directly write to said at least one corresponding hardware display device.

2. A method according to claim 1 further comprising the step of activating a successive virtual terminal, associated with said successive program application, which is not designated as non participating in said shifting operation.

3. A method according to claim 2 wherein the method of shifting further comprises the steps of:
    determining which of said hardware display devices are required by said successive program application;
    retracting access to said hardware display devices, required by said successive program application, from use by any other of said plurality of program application; and
    granting access, to said required hardware display devices, to said successive program application.

4. A method according to claim 3 wherein said step of determining comprises the step of providing a mechanism by which said program application currently accessing at least one of said hardware display devices, required by said successive program application, may make an inquiry as to which ones of said hardware display devices must be retracted.

5. A system which shifts the focus between program applications, by implementing a single shifting operation, comprising:
    a plurality of hardware display devices;
    a plurality of said program applications each corresponding with and writes directly to at least one of said hardware display devices;
    a plurality of virtual terminals, each of said virtual terminals being associated with a particular one of said plurality of program applications and at least one of said plurality of program applications having more than one said virtual terminal associated therewith, each said virtual terminal directly corresponding to one of said hardware display devices;
    means for designating all but one of said virtual terminals associated with a particular one of said plurality of applications as non participating in said shifting operation; and
    means for shifting, in a single operation, the focus from a first one of said plurality of program applications to a successive one of said program applications to a successive one of said program applications, thereby allowing said successive applications to directly write to said at least one corresponding hardware display device.

6. A system according to claim 5 further comprising means for activating a successive virtual terminal, associated with said successive program application, which is not designated as non participating in said shifting operation.

7. A system according to claim 6 further comprising:
means for determining which of said hardware display devices are required by said successive program application;
means for retracting access to said hardware display devices, required by said successive program application, from use by any other of said plurality of program application; and
means for granting access, to said required hardware display devices, to said successive program application.

8. A system according to claim 7 wherein said means for determining comprises means for providing a mechanism by which said program application currently accessing at least one of said hardware display devices, required by said successive program application, may make an inquiry as to which ones of said hardware display devices must be retracted.

9. A system which shifts the focus between program applications in a virtual terminal environment, including a plurality of hardware display devices and a plurality of said program applications each corresponding to and writes directly to at least one of said hardware display devices, by implementing a single shifting operation comprising:
a plurality of virtual terminals, each of said virtual terminals being associated with a particular one of said plurality of program applications and at least one of said plurality of program applications having more than one said virtual terminal associated therewith, each said virtual terminal directly corresponding to one of said hardware display devices; and
means for designating all but one of said virtual terminals associated with a particular one of said plurality of applications as non participating in said shifting operation; and
means for shifting, in a single operation, the focus from a first one of said plurality of program applications to a successive one of said program applications, thereby allowing said successive applications to directly write to said at least one corresponding hardware display device.

10. A system according to claim 9 further comprising means for activating a successive virtual terminal, associated with said successive program application, which is not designated as non participating in said shifting operation.

11. A system according to claim 10 further comprising:
means for determining which of said hardware display devices are required by said successive program application;
means for retracting access to said hardware display devices, required by said successive program application, from use by any other of said plurality of program applications; and
means for granting access, to said required hardware display devices, to said successive program application.

12. A system according to claim 11 wherein said means for determining comprises means for providing a mechanism by which said program application currently accessing at least one of said hardware display devices, required by said successive program application, may make an inquiry as to which ones of said hardware display devices must be retracted.

* * * * *